United States Patent [19]

Joyce

[11] 4,255,782
[45] Mar. 10, 1981

[54] ELECTRICAL ENERGY CONVERSION SYSTEMS

[75] Inventor: Michael F. Joyce, Chicago, Ill.

[73] Assignee: JGF, Incorporated, Chicago, Ill.

[21] Appl. No.: 851,686

[22] Filed: Nov. 15, 1977

[51] Int. Cl.³ .............................................. H02M 5/04
[52] U.S. Cl. ........................................ 363/8; 363/159
[58] Field of Search .............. 363/8, 39, 43, 123–128, 363/157, 159, 163; 323/24–25; 307/108, 249, 251, 288

[56] References Cited

U.S. PATENT DOCUMENTS

| | | | |
|---|---|---|---|
| 3,419,787 | 12/1968 | Baehre | 307/288 X |
| 3,437,909 | 4/1969 | Walker | 363/126 |
| 3,633,048 | 1/1972 | Kleinberg | 307/288 X |
| 3,651,340 | 3/1972 | Cliff | 307/288 X |
| 3,731,183 | 5/1973 | Johnson et al. | 323/24 |
| 3,801,832 | 4/1974 | Joyce | 307/252 TX |
| 3,801,893 | 4/1974 | Joyce | 307/108 X |
| 3,921,053 | 11/1975 | Hekimian | 363/126 X |
| 4,039,864 | 8/1977 | Tokunaga et al. | 307/252 T |
| 4,100,595 | 7/1978 | Pollmeier | 363/124 X |

Primary Examiner—J. D. Miller
Assistant Examiner—Peter S. Wong
Attorney, Agent, or Firm—James T. FitzGibbon

[57] ABSTRACT

Electrical circuits, apparatus and methods for a variety of applications. A switching device subdivides an alternating current input signal into a plurality of lower voltage pulses by switching on and off in response to the characteristics, such as the voltage and current, of the input signal, and the pulses of current are intermittently passed to a capacitor in series with the device as the voltage on the input signal is positive-going. When the voltage becomes negative-going, the capacitor is discharged, usually with the pulses passing through the switch in the opposite direction. Work is done by energizing the series capacitor, or by energizing a capacitor in parallel with the switch, or by energizing an inductor in parallel or series relation to the switch, or a combination of the above. The inductor may be the primary winding of a transformer, or may create an electrical or magnetic field which is transduced into mechanical motion. The load may also be a resistive load. Where a tranformer is provided, the output of the secondary may be used as a power supply, with or without additional filtration. The transformer may have a unity turns ratio, or may step the voltage up or down as desired. Where the device is used as a power supply, and in other applications, a direct or alternating current output is provided which can be very carefully controlled as to voltage with minimum circuitry being necessary to accomplish this purpose.

17 Claims, 44 Drawing Figures

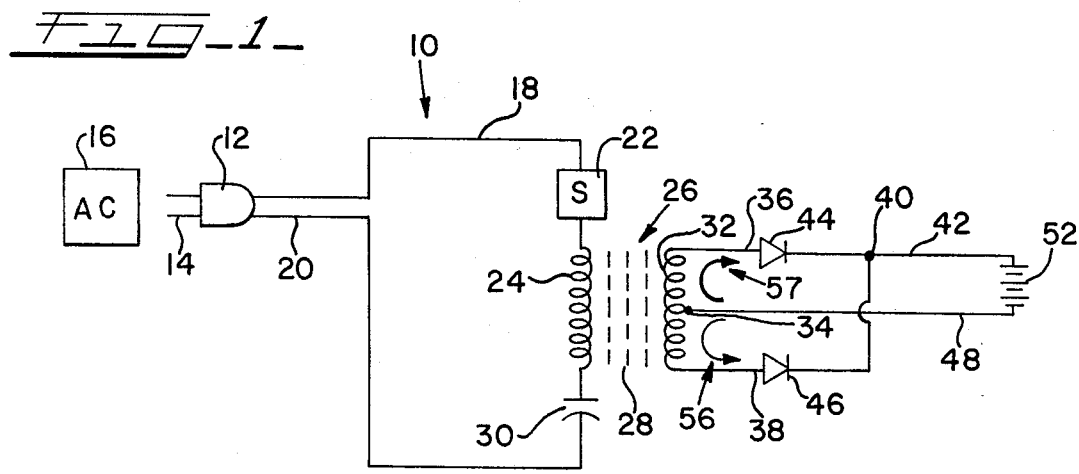
FIG-1-
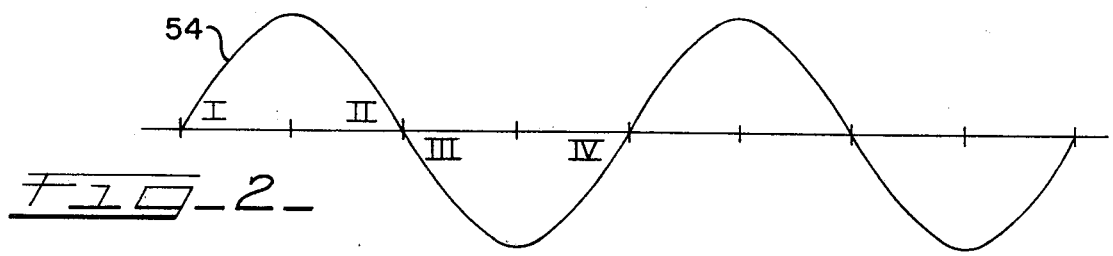
FIG-2-
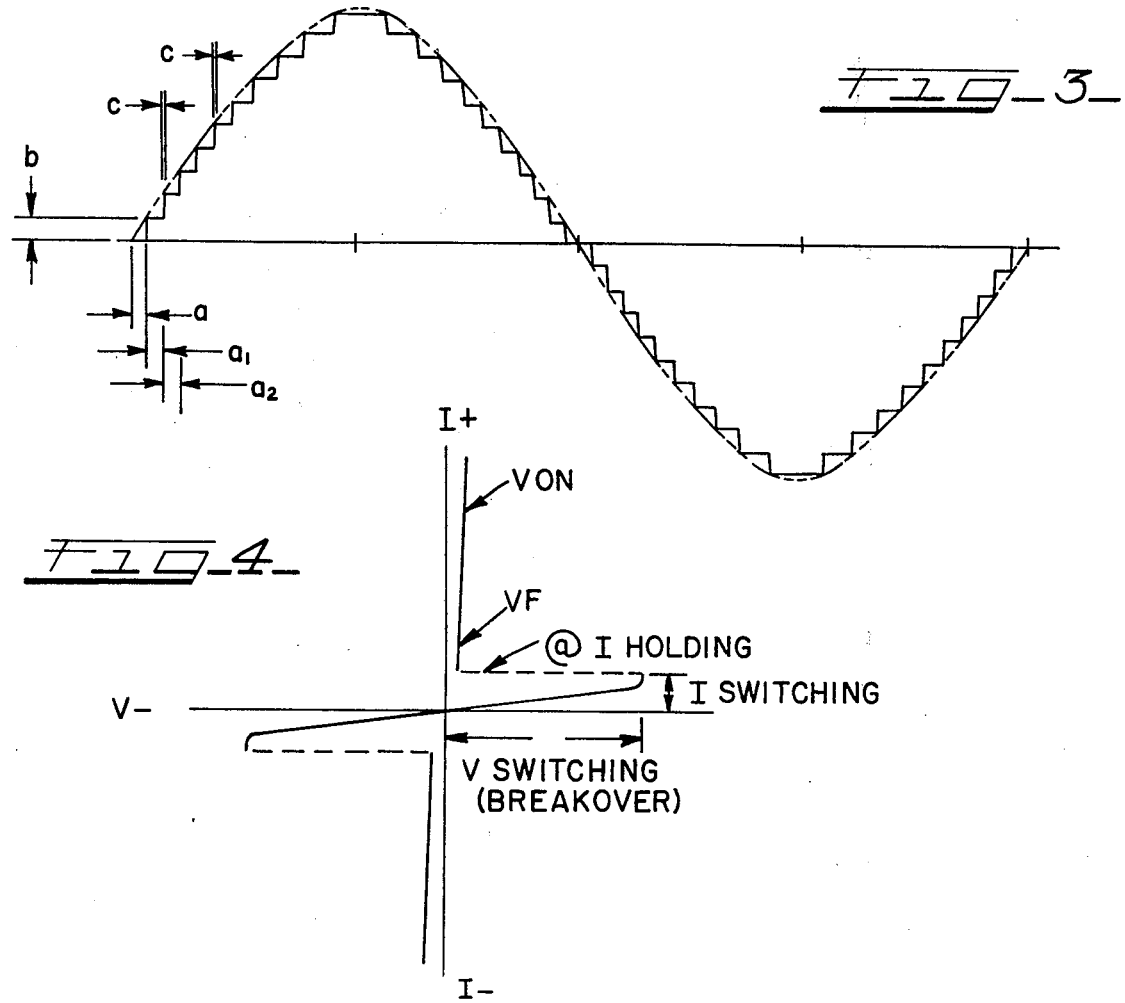
FIG-3-
FIG-4-

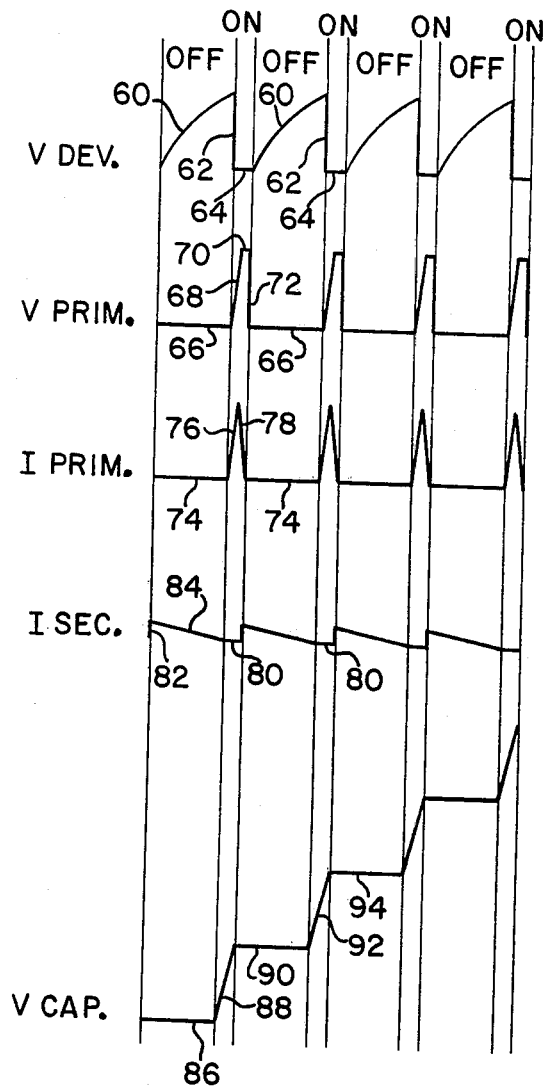
FIG_3A_
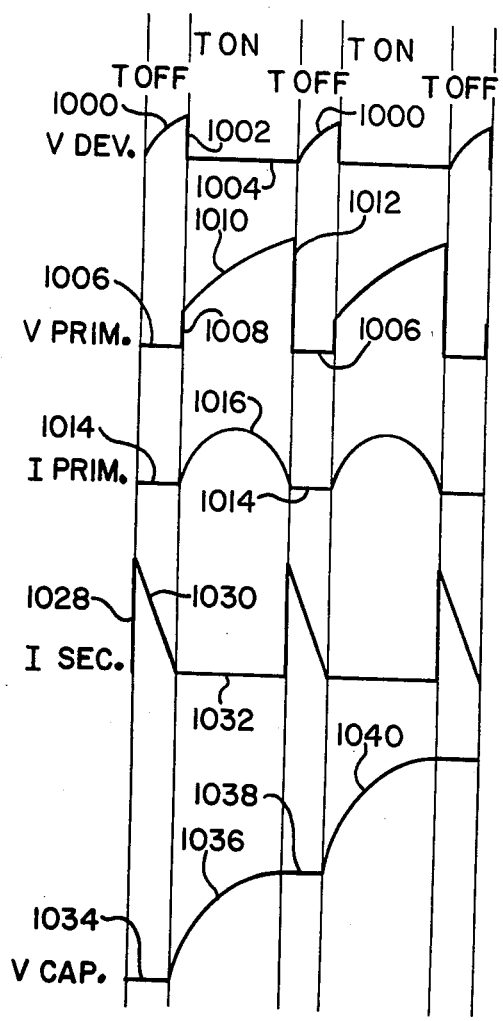
FIG_3O_
FIG_3B_
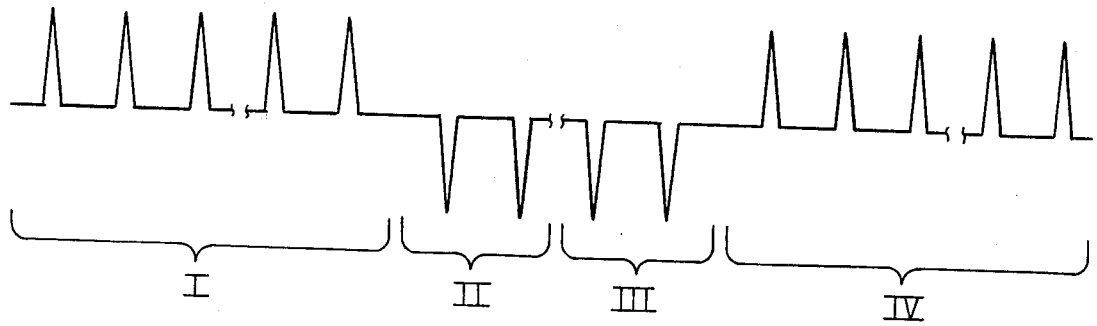

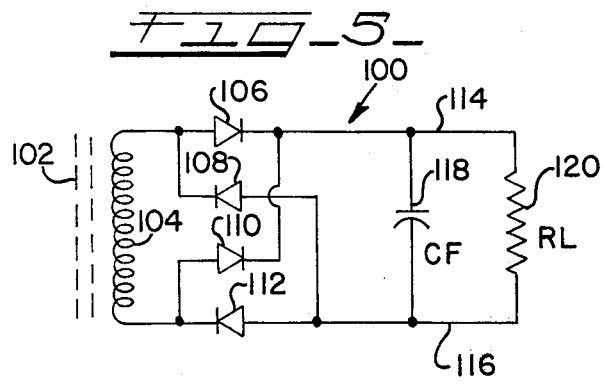
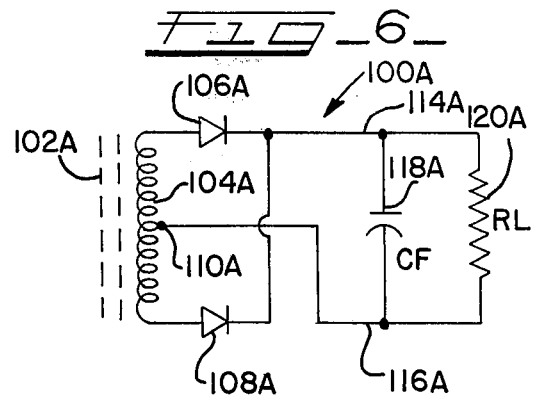
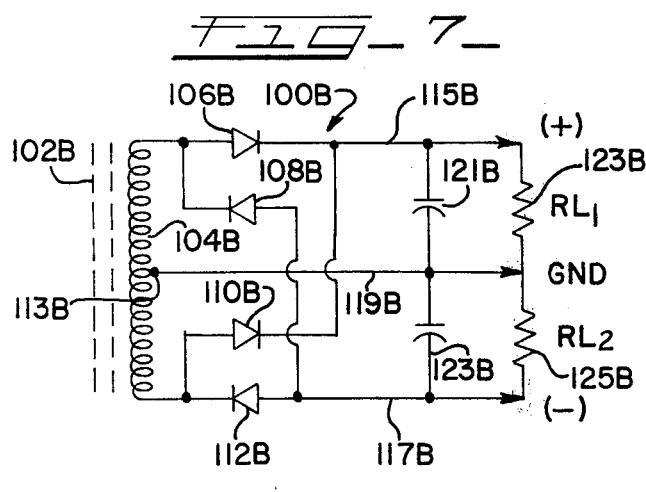
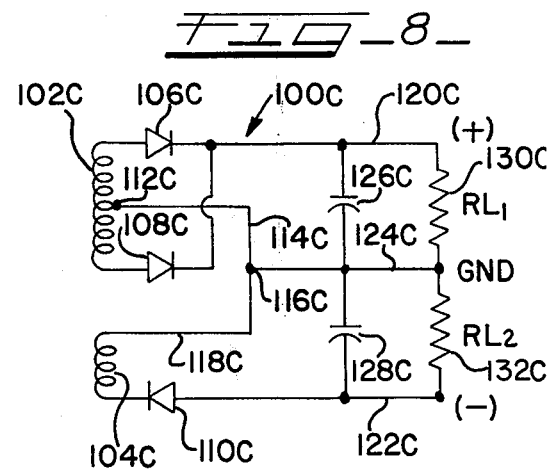
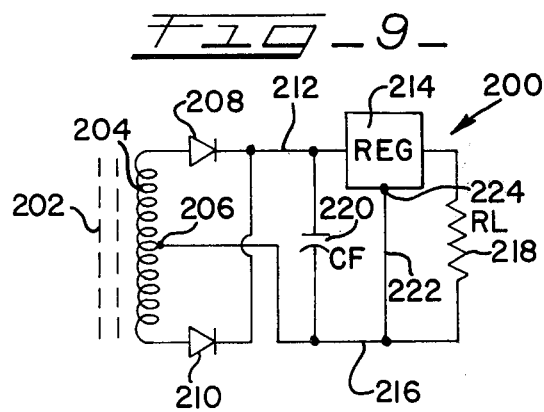
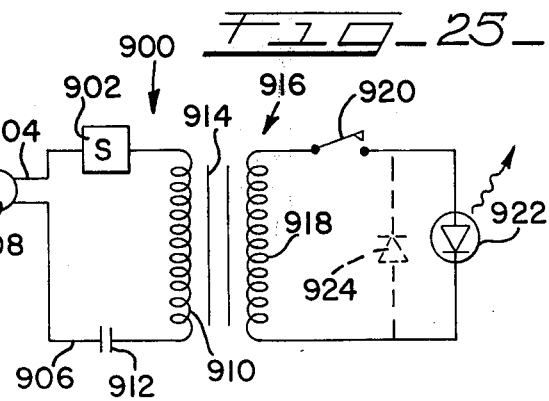

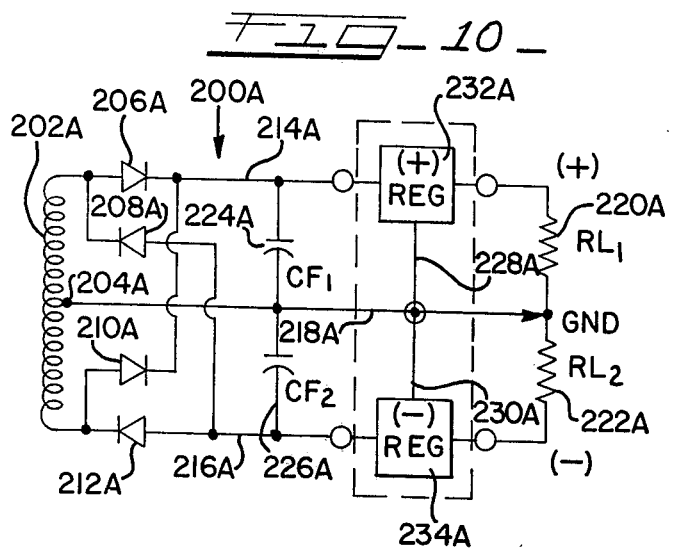
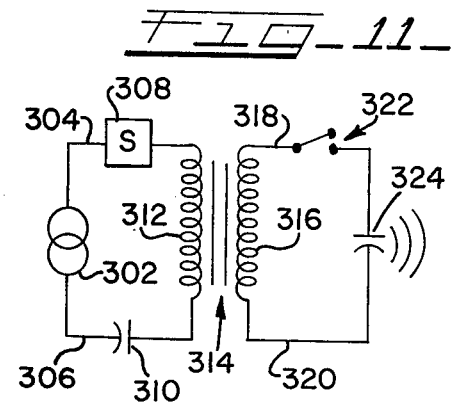
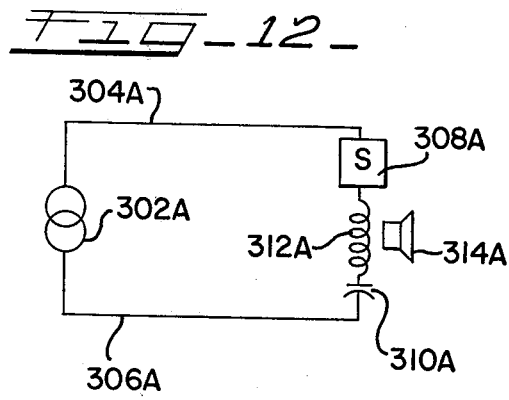
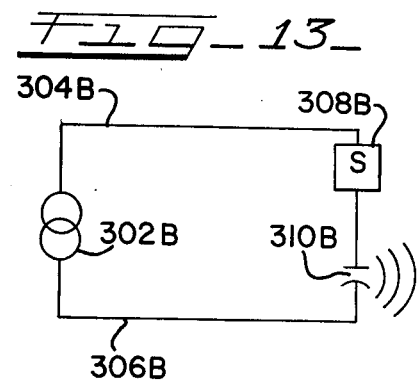
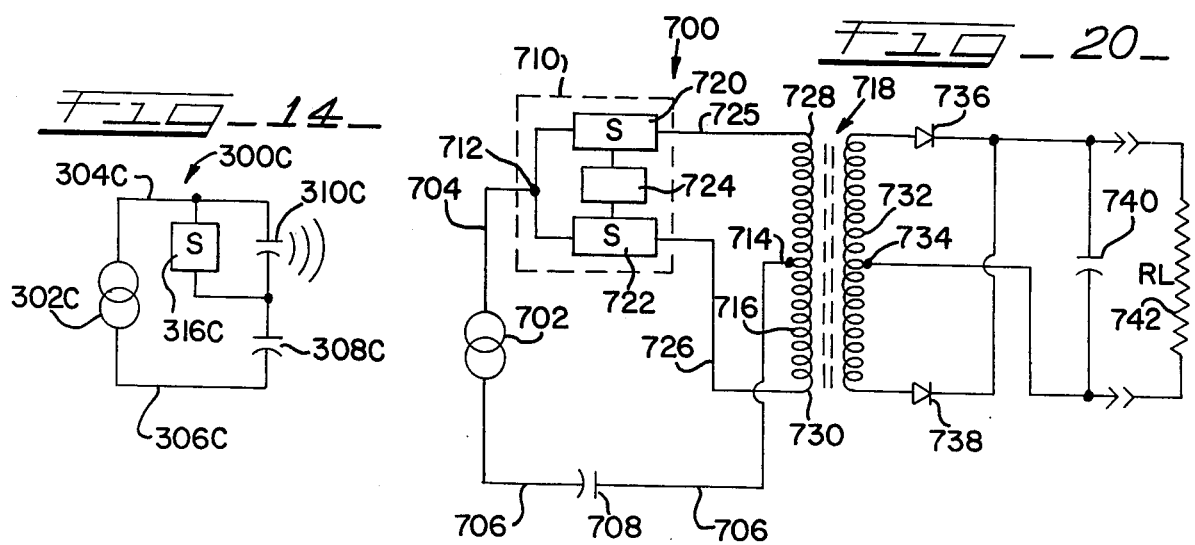

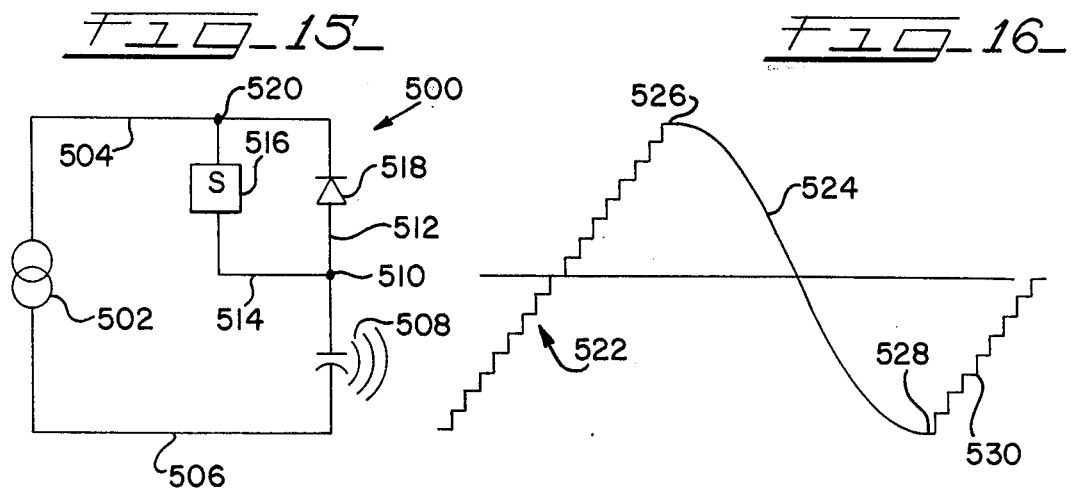
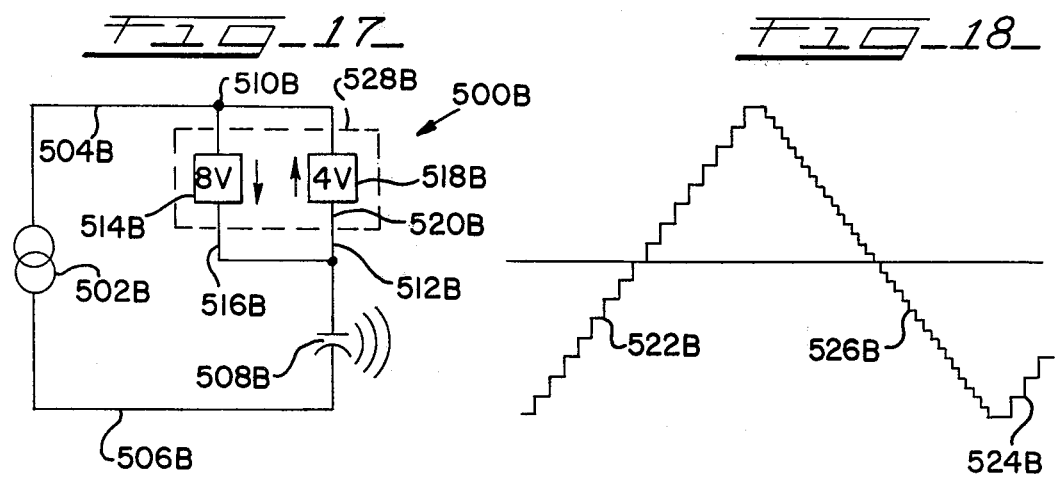
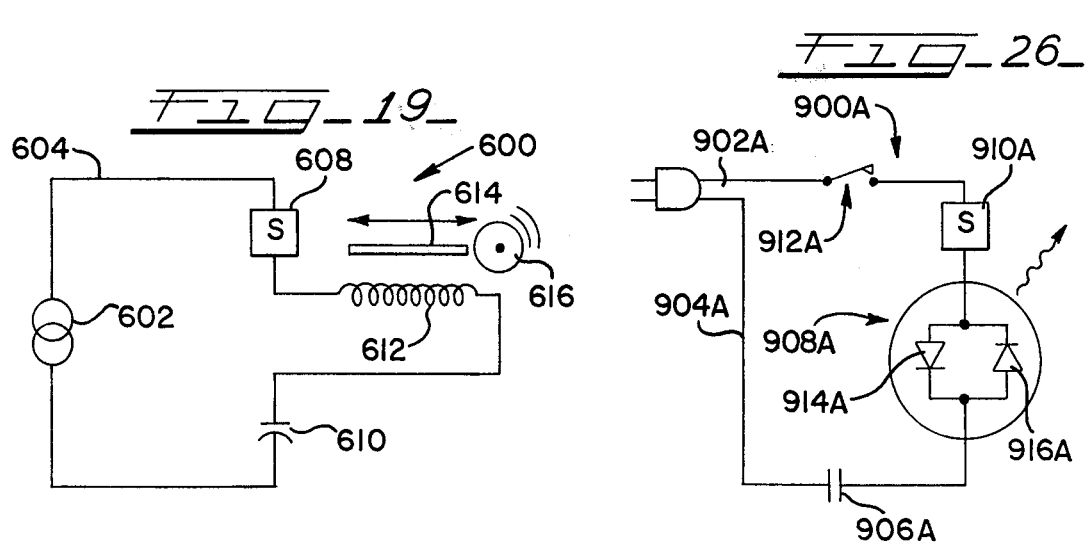

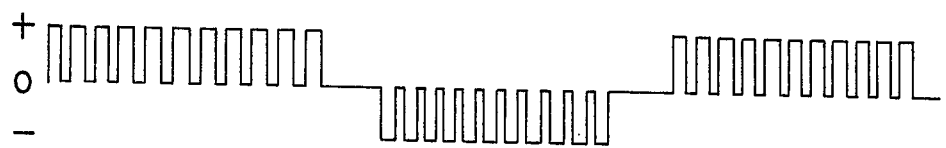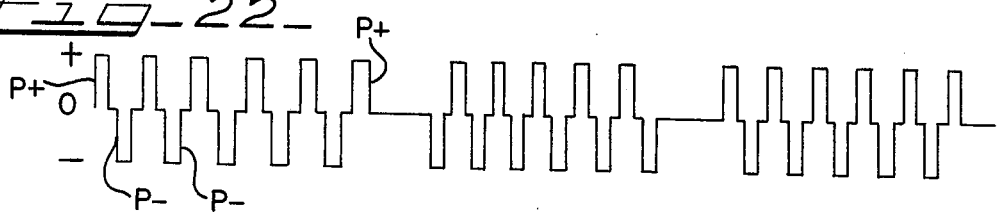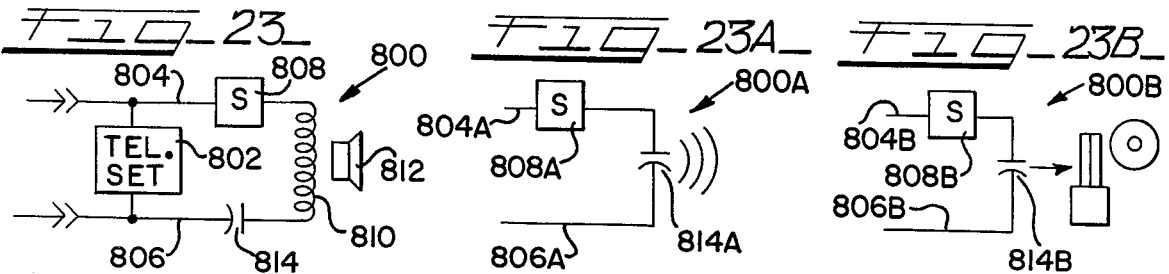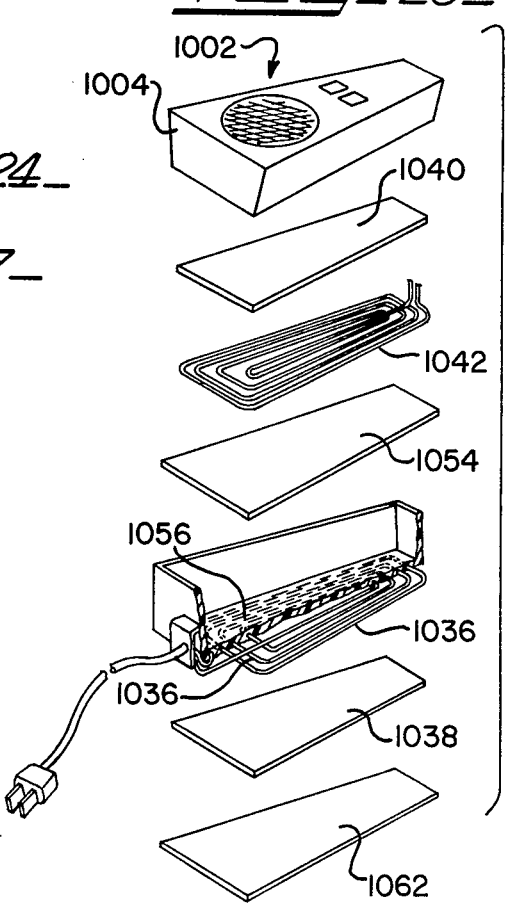

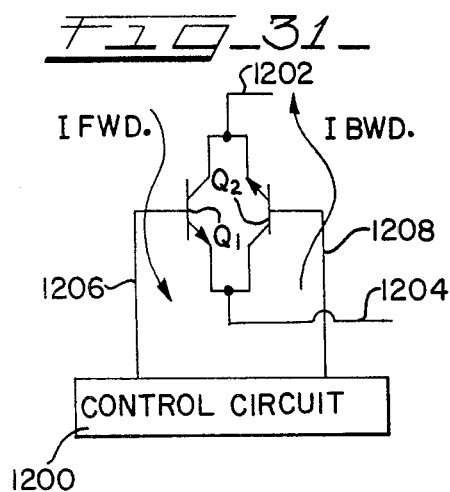
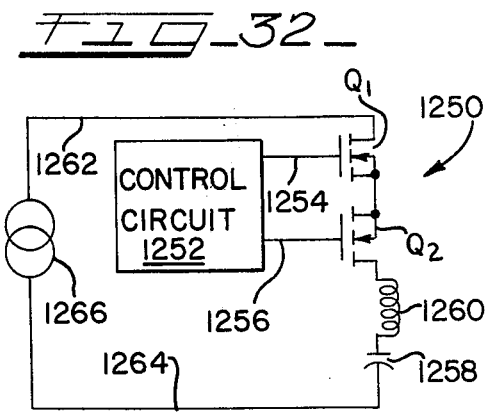
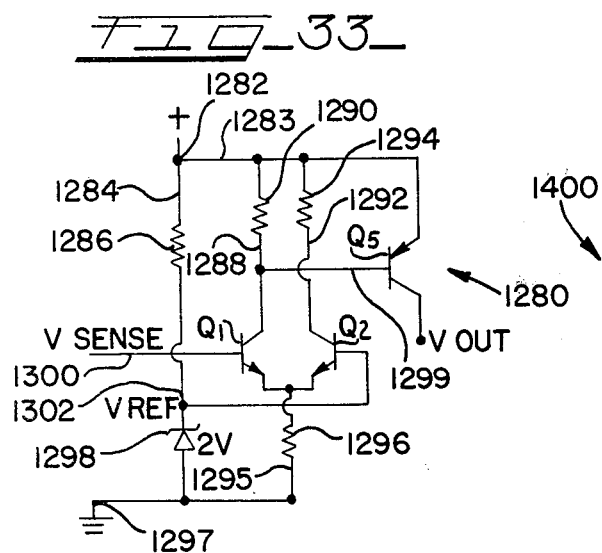
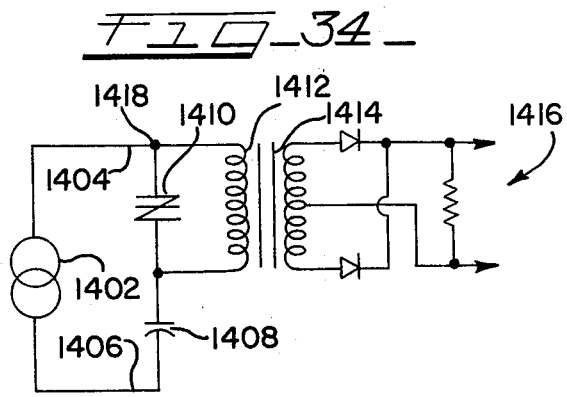
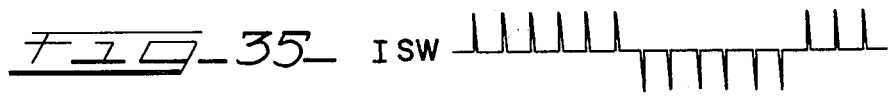

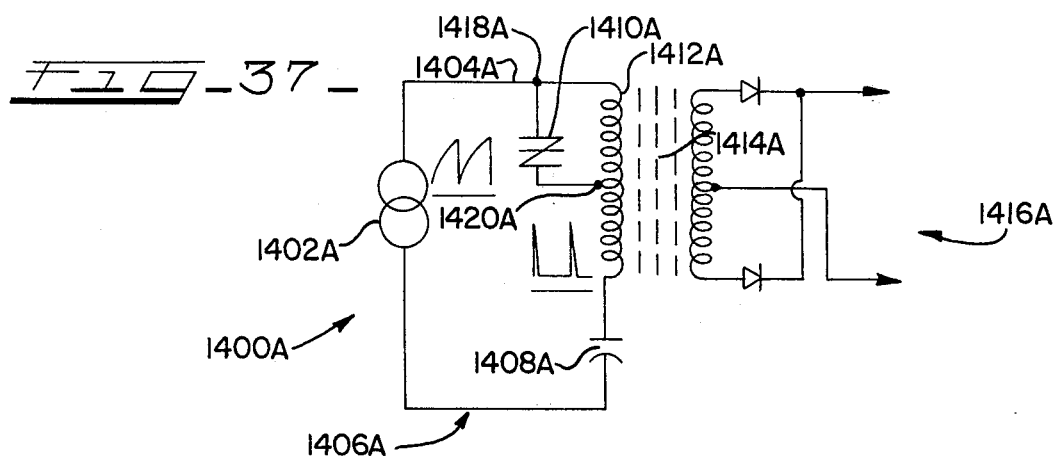
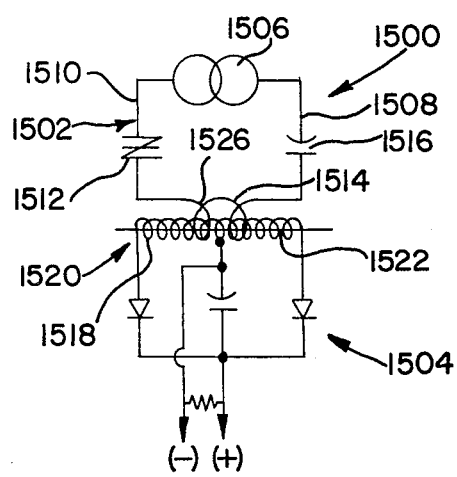
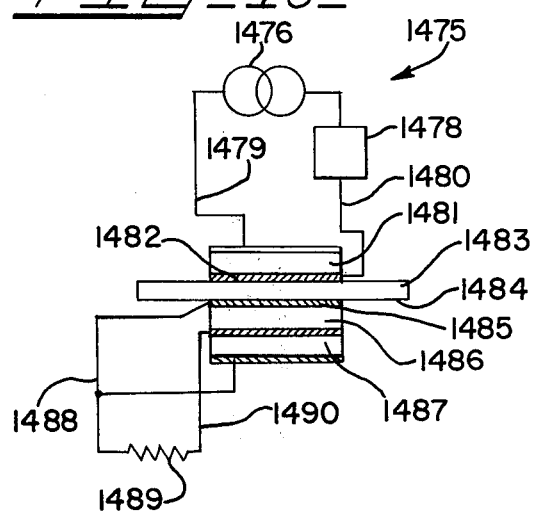
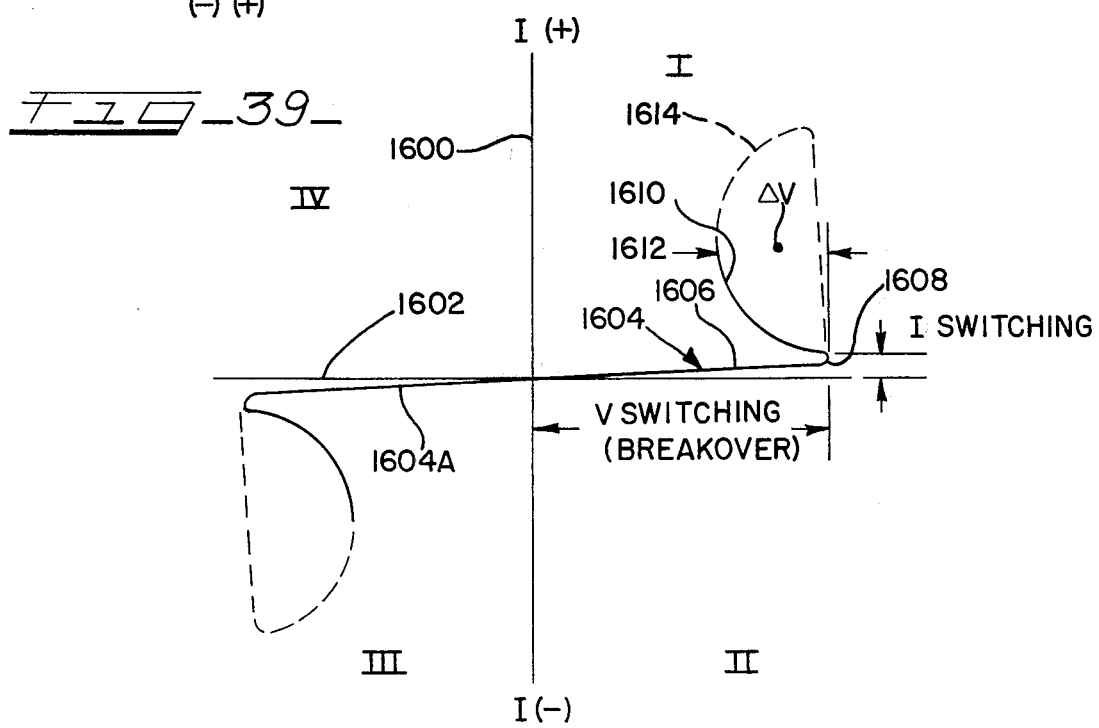

ELECTRICAL ENERGY CONVERSION SYSTEMS

BACKGROUND OF THE INVENTION

The present invention relates generally to electrical devices, and more particularly, to novel electrical circuits and to energy conversion devices embodying such circuits. The invention relates to circuits, devices and methods for changing both the voltage and the frequency of a given input signal, in a simple and straightforward way, into a signal of different voltage and frequency.

The devices are particularly suited to handling small to moderate amounts of power, and a typical device made according to the invention is lighter in weight, much more compact, and can be made at greatly reduced cost in relation to prior art devices intended for the same or similar purposes.

In addition to their inherent ability to create an output signal having a decreased voltage and an increased frequency in relation to the input signal, the devices are inherently capable of providing an output signal of a relatively stabilized voltage, which signal is relatively independent of the input voltage. The devices are therefore useful in a wide variety of applications wherein a closely regulated input voltage is not easily available, and in applications wherein a closely regulated output voltage is desirable. In many such cases, devices made according to the present invention are adaptable for use with input voltages which vary considerably; the devices are inherently able to provide highly stabilized voltage output signals even where the input voltage varies widely.

In certain applications, devices made according to the invention are able to use transformers which are much smaller and/or more efficient than those which would be required for counterpart prior art devices. In still other aspects of the invention, circuits made according to the invention are able to be combined with other known electrical circuits, and, in combination with such circuits are able to derive significant additional advantages in use such as providing greater efficiency, creating less waste heat in use, and the like.

In still other aspects, circuits are provided which, according to the invention, use single components for two purposes, that is, such circuits use elements required for the present invention to perform functions in addition to those provided for their primary purpose. In a number of applications, the invention provides circuitry which is greatly simplified in relation to prior art circuitry, and the invention thus provides means for making a number of commercial devices characterized by significantly lower cost and greater simplicity.

By way of example, the invention is able to be used to provide devices such as direct current power supplies, battery chargers, noise makers, such as those used in doorbells, annunciators, smoke alarms, and the like. Other commercial devices which advantageously embody the present invention include optical signalling devices such as light-emitting diodes driven with relatively intense high-frequency pulses, and the like. In still other applications, the signals created by circuits of the invention are used to drive piezoelectric devices, magnetostrictive devices or the like and these devices use the mechanical energy created thereby for operations such as ringing telephones or the like, thereby replacing heavy and expensive prior art magnets, bells, etc.

A typical circuit made according to the invention includes, in simple form, a bilateral, preferably electrically symmetrical, switch and a capacitor in series therewith, with a load being placed in series circuit relation relative to the switch and the capacitor, or placed in parallel or shunt relation across the capacitor.

In other forms, the switch may not be symmetrical, but instead may consist of a voltage or current sensitive switch having certain breakover characteristics in a forward direction and other breakover characteristics in an opposite direction. In typical applications, the load may either consist of the capacitor itself in series with the switch, or the load may be exterior of the switch and capacitor circuit, with such load being energized or driven by an element which is in mutually inductive relation to an inductor placed in series in the switch-capacitor circuit.

Where an inductor is in series relation with the switch and capacitor, the secondary inductor which is typically provided forms a part of a secondary circuit which may vary considerably in design, depending upon the application or end product sought to be obtained.

In another aspect, the invention makes possible the use of its inherent voltage lowering and frequency converting feature to reduce the size of a transformer needed for a particular application, and the reduction of transformer size may in turn be taken advantage of by incorporating the secondary of the transformer into a battery or other device where this is indicated for purposes of convenience.

As one example concerning reduction of transformer size, articles such as battery chargers or DC power supplies used for small appliances, instruments and the like may use a transformer which weights merely a small fraction of an ounce in contrast to transformers which weigh five to eight ounces or more and which are typically used to power articles such as tape recorders, small calculators, and the like. As an example of a device incorporating the transformer secondary into a part thereof, the present application describes a battery powered appliance having a rechargeable battery which is secured within the instrument, such as a radio or telephone signalling apparatus (a "pocket pager") and from which it is not desirable or necessary to remove the battery periodically for recharging. In this case, a small stand or the like is provided, with the stand unit containing the switch and capacitor elements of the invention together with the primary circuit portion of an output transformer. The stand unit is adapted to be plugged into a wall outlet. The pocket pager or the like includes a rechargeable battery therein, and the rechargeable battery includes a pair of charging leads electrically connected to the transformer secondary via a rectifier diode(s). The primary and secondary windings are arranged respectively in relatively flat planes and are disposed within the respective devices so that when the pager, radio or the like, rests upon the stand, the primary in the stand and secondary in the pager are brought into proximity although they are not connected by a metallic or galvanic connection.

When the pager or the like which contains the battery thus rests adjacent the charging device, the battery can be charged without removing the battery from the pager or connecting it to the charger. Batteries themselves, or articles containing them can therefore be charged in a matter of a few hours or less, or overnight, as preferred, merely by placing them in physical proximity to the charger which is preferably designed to receive and orient the product so that the primary and secondary coils are in the desired spatial relationship to each other.

Referring to another advantageous feature of the invention, it is common for power supplies used with small calculators and the like to include transformers which are relatively large in view of the power passed therethrough, such transformers being made in these sizes by reason of being called upon to transform relatively high voltages—110 to 220 v. at relatively low frequencies—50 or 60 Hz. Commercially available transformers of this type commonly include a switch and associated circuitry adapting the same transformer for operation with both 110 and 220 v. sources. The fifty cycle transforming operation requires a somewhat larger, heavier core, and consequently a transformer designed for both 50 and 60 cycle operation is unduly heavy if it is in fact used for 60 cycle operation only; on the other hand if a transformer designed for 60 cycle operation is operated at 50 cycles, it will be overlooked. According to the present invention, however, the size and weight of the transformer may be made so small as to be virtually insignificant. Because of the operating principle of the device, no switch is necessary to adapt the device to either 110 or 220 v. operation.

The invention relates also to a method of incrementally charging and discharging a capacitor in series with a voltage- or current-sensitive bilateral or like switch, periodically charging and discharging the capacitor in response to the ever-increasing or decreasing voltage level of the input signal.

While a very simple form of circuit made according to the invention will satisfactorily handle low or moderate power applications, modified forms of the circuit may also be made which can deal with larger amounts of power as well. While the device would normally be used with single-phase current, devices made according to the invention could also be used with three-phase or other current if and when there were some reason to do so.

Referring now to the general background of the invention, most electric power in the world is generated as alternating current in either a fifty or sixty Herz (cycles per second) frequency, and although the voltages used in long distance and local transmission of electric energy are often extremely high, such as several hundred thousand volts or more, the voltage ultimately made available at the point of typical usage is 100 to 270 volts AC for domestic and commercial customers, with perhaps somewhat higher voltages such as 440 volts being available to industrial customers. Unless stated or implied otherwise, such nominal AC voltages are the root mean square (rms) rather than peak voltage value of the signal.

A small, although still sizable, amount of energy is generated at other frequencies, and such as 16.6, 20, 25, 30, 33.3, 40, 42, 50,, 54, 60, 66, and 66.6 Hz, at voltages ranging from about 60 to 120 volts, for the purposes of ringing telephones, with interrupted 20 and 30 Hz ringing frequencies being perhaps the most commonly used for this purpose. In other cases, small but still significant amounts of power are generated at frequencies from about 400 Hz to 1,000 Hz, usually at 115 volts AC. For aircraft usage, 400 Hz is probably the most commonly used freqency.

The basic reason for generating energy at different frequencies may relate to the method of generating the current, or to certain requirements of the signal once generated. For example, multi-poled generators of the type used in electric utilities are extremely large, and peripheral velocity considerations tend to limit armature speeds such that cyclic generation in the order of 50 to 60 Hz. In the case of telephones, the lower frequencies were chosen to separate the signal and voice paths which customarily operate on the same pair of wires on each telephone subscriber line.

In the case of some of the higher frequencies, such as in aircraft and aerospace applications, efficiency, minimum size and minimum weight are highly important considerations; therefore, relatively high frequencies of 400 to 1,000 or even 10,000 Hz are generated in the first instance. These frequencies permit reduction in the relative size of the magnetic components of the apparatus, namely, they permit generator, motor and transformer components which are of greatly reduced mass relative to their counterparts using for low frequency magnetic induction as a part of their operation.

However, it is well known that although power is generated and distributed at certain characteristic voltages and frequencies, it is extremely common to transform such power and/or otherwise convert it into a signal which has greatly different characteristics, generally for reasons relating to the type of apparatus being powered.

More specifically, while a number of appliances and the like are powered by synchronous or other motors using 60 Hz, 110 volt AC, a significant amount of domestic alternating current is converted into direct current (DC). Such conversion to DC may take place to operate such articles as microwave ovens, tape recorders, calculators, television sets, etc., either within, partially within, or outside ofthe powered unit.

In view of the present need for simpler and more efficient electrical devices, it is an object of the present invention to provide a novel electrical circuit having a number of useful applications.

Another object of the invention is to provide an improved electrical circuit which is capable of use with other known circuits to provide a variety of useful devices.

A still further object of the invention is to provide improved electrical devices which utilize a given input frequency and voltage and which, in operation, produce or utilize a different output voltage and frequency.

Another object of the invention is to provide a device which is capable of subdividing an electrical input signal into a plurality of pulses having a reduced voltage with respect to the input voltage and a higher frequency than the input frequency.

Still another object of the invention is to provide an electrical device which is adapted to convert an input signal into an output signal characterized by carefully regulated output voltage.

Another object of the invention is to provide an improved electrical device which is highly efficient in use and which adapts itself to miniaturization for a larger number of applications.

Still another object of the invention is to provide an electrical circuit which may be used in a large variety of commercially useful devices, and which operates on a novel electrical principle.

A still further object of the invention is to provide an electrical device which can provide or use output signals having a reduced voltage and increased frequency with respect to the input signal, and which can achieve and produce such signal without the use of conventional inverters, vibrators, or the like.

Another object of the invention is to provide an electrical circuit which can be used to produce an improved direct current power supply.

Yet another object of the invention is to provide an economical and simple circuit adapted to power products operated by pulsating alternating or direct currents.

A still further and important object of the invention is to provide a device capable of operating with input voltages ranging widely, such as between 90 and 240 volt AC, for example, and having input frequencies ranging from 47 to 66 Hz and still characterized by a stable output voltage in spite of such variations of input voltage, frequency, or both.

A further object of the invention is to provide an improved power supply device which, when used in association with known power supply components, provides increased efficiency and other advantages in use.

Another object of the invention is to provide a battery charger having several highly desirable characteristics.

Another object of the invention is to provide various devices such as audio or visual annunciators or the like and which embody the novel circuit to provide useful functions at reduced cost.

Another object of the invention is to provide electrical devices which make possible the replacement of more expensive components when used in ringing devices such as doorbells, telephones, and the like.

Another object of the invention is to provide an electric circuit which may be advantageously used with magnetostrictive or piezoelectric devices, and which is characterized by improved simplicity and reliability in respect to prior art devices and circuits intended for the same purpose.

Still another object of the invention is to provide a simplified circuit which is adaptable to produce multiple, alternate output frequencies and to provide devices which use such frequencies for different applications.

A still further object of the invention is to provide an electrical circuit which includes a voltage- or current-sensitive switch device in series with a capacitor, with the circuit being adapted to be placed across an alternating current source to provide a number of desirable features and characteristics when used with an electrical load placed in series between the switch and the capacitor or, in some cases, in parallel or shunt relation to the switch.

Yet another object of the invention is to provide a circuit wherein the voltage of the output signal depends on the breakover voltage of the switch device rather than upon the voltage of the input signal.

A still further object of the invention is to provide a device which is able to produce an output signal of higher frequency and lower voltage than that of the input signal supplied to the device, and which creates greatly reduced stray magnetic fields by reason of using one or more transformers of greatly reduced size.

An additional object of the invention is to provide an electrical circuit which includes a bilateral switch and a capacitor in series with an inductive load placed in series with the capacitor and the switch.

A still further object of the invention is to provide a circuit having a bilateral switch, a capacitor and an inductor in series, and wherein the inductor is inductively coupled to a secondary circuit adapted to provide a variety of functions.

These and other objects and advantages of the invention, including those inherent therein, are achieved in practice by providing a circuit having voltage- or current-sensitive switch means in series with a capacitor, and wherein an electrical load forms a part of, or is placed in series or parallel relation with, such circuit.

The invention also achieves certain of its objects by providing a switch and capacitor in series, with an inductor in series relation therewith, and by providing various circuit elements in cooperative relation with such switch capacitor inductor.

The invention also achieves certain of its objects by providing a simplified apparatus and method for subdividing an input signal into a plurality of pulses of current characterized by reduced voltage and increased frequency with respect to those characterized of the input signal.

The exact manner in which these and other objects and advantages of the invention are attained in use will be more clearly apparent when reference is made to the detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a schematic drawing of a form of battery charger embodying the principles of the present invention;

FIG. 2 is a schematic diagram showing the waveform of a typical alternating input signal fed to the device of FIG. 1 and showing the relation of voltage to time;

FIG. 3 is a voltage/time diagram of a typical output waveform created in the circuit of the present invention by the action of the switch and capacitor of the circuit;

FIG. 3a is a composite schematic diagram showing electrical characteristics of various portions of the circuit of FIG. 1 from time to time during operation of the device;

FIG. 3b is a schematic diagram of the configuration and polarity of the electrical pulses flowing in the primary circuit of the device of FIG. 1 from time to time as the input signal to the apparatus of FIG. 1 is changing as shown in FIG. 2;

FIG. 4 is a voltage/current diagram showing the switching characteristics of a typical bilateral switch which may be used in a circuit made in accordance with the invention;

FIG. 5 is a schematic diagram of a secondary circuit which is useful with the primary circuit portion of the apparatus shown in FIG. 1, and showing a secondary winding and a full wave rectifier and filter capacitor associated therewith;

FIG. 6 is a schematic diagram of another secondary circuit useful with the primary circuit portion of FIG. 1;

FIG. 7 is a schematic diagram of another secondary circuit useful with the primary circuit portion of FIG. 1;

FIG. 8 is a schematic view of still another form of secondary circuit useful with the primary circuit portion of the apparatus shown in FIG. 1 and showing the secondary circuit to include a pair of secondary windings;

FIG. 9 is a schematic illustration of another form of secondary circuit useful with the primary circuit portion of the apparatus shown in FIG. 1 and showing a linear voltage or current regulator in the circuit;

FIG. 10 is a schematic view of a secondary circuit similar to that of FIG. 9 but showing a pair of voltage/current regulators in the circuit;

FIG. 11 is a schematic illustration of a circuit showing a switch controlled audible signal or noisemaker unit or the like using the novel circuit of the invention;

FIG. 12 is a schematic view of a different form of audible signal or noisemaker apparatus using a simplified form of circuit according to the invention;

FIG. 13 is a schematic view of another audible signalling apparatus noisemaker similar to that of FIG. 12;

FIG. 14 is a schematic view of another form of noisemaker apparatus embodying the principles of the invention and showing the switch in parallel or shunt relation to the load;

FIG. 15 is a schematic view of a further modified form of a signalling unit or noisemaker according to the invention;

FIG. 16 is a diagrammatic view of the voltage/time waveform produced in one part of the circuit of FIG. 15;

FIG. 17 is a schematic view of a modified form of audible signalling unit or noisemaker adapted to produce a pair of signalling frequencies;

FIG. 18 is a diagrammatic view of the voltage/time waveform generated in one part of the circuit of FIG. 17;

FIG. 19 is a schematic view of a form of audio and/or ultrasonic transducer device incorporating the circuit of the invention and showing a magnetostrictive striker element and associated bell;

FIG. 20 is a schematic view showing a power supply apparatus incorporating the principles of the invention and showing a modified form of switch device used therein;

FIG. 21 is a diagrammatic view of a type of waveform which can be produced by an apparatus similar to that shown in FIG. 1;

FIG. 22 is a diagrammatic view of a type of waveform which can be produced by an apparatus of the type shown in FIG. 20;

FIG. 23 is a schematic view of an apparatus incorporating the principles of the invention and adapted to serve as an audible signalling device adapted for use with a telephone;

FIG. 23a is a schematic view of an apparatus similar to that of FIG. 23, showing a different form of signalling element;

FIG. 23b is a schematic view of an apparatus similar to that of FIG. 23, showing another form of signalling element;

FIG. 24 is a schematic view of a voltage/time diagram showing the characteristics of the electrical signals used to create telephone ringing signals according to prior art practice;

FIG. 25 is a schematic view of a form of circuit made according to the invention, which is useful to produce a visible signal;

FIG. 26 is a schematic view of another form of circuit incorporating the principles of the invention and adapted to provide visible signalling;

FIG. 27 is a schematic view of the electrical circuit of an electrically powered apparatus which includes a portion of the battery charging circuit therefor associated with the apparatus and showing the other portions of the charging circuit to be separable therefrom in use;

FIG. 28 is a perspective view of a "pocket pager" and a companion piece therefor adapting the pager unit to convenient battery recharging;

FIG. 29 is an exploded perspective view, with portions broken away, showing certain elements of the apparatus of FIG. 28;

FIG. 30 is a composite schematic diagram showing the electrical characteristics of various portions of a circuit similar to that of FIG. 1 but containing a modified form of switching device;

FIG. 31 is a schematic view showing a transistorized or multi-component form of controllable switching device useful with the invention;

FIG. 32 shows another form of controllable switching device useful with the invention and showing the same in a simple series circuit according to the invention;

FIG. 33 is a schematic view of a portion of a circuit used to control switching devices such as those shown in FIGS. 31 and 32;

FIG. 34 is a further modified form of circuit made according to the invention;

FIG. 35 is a schematic view of the current waveforms present in the switching device of FIG. 34 during operation thereof;

FIG. 36 is a schematic view of the current waveforms present in the primary winding portion of the circuit of FIG. 34 during operation thereof;

FIG. 37 is a schematic view of a modified form of circuit of the invention, similar to that of FIG. 34 but differing therefrom in detail;

FIG. 38 is a schematic view of another form of apparatus of the invention utilizing a compact "transformer" of the so-called Wiegand wire type;

FIG. 39 is a diagrammatic view of the voltage and current characteristics of a "Diac" bilateral switching device which is useful in making battery chargers and other circuits and apparatus according to the invention; and FIG. 40 is another circuit made according to the invention, showing a transducer or energy transformer device of the non-electromagnetic type.

DESCRIPTION OF THE PREFERRED EMBODIMENTS OF THE INVENTION

It will be understood that the principles of the present invention are applicable to a wide variety of electrical and electronic devices. Accordingly, examples will be given of different circuits embodying the present invention, and a description of the merits of the invention in regard to various forms of devices will be set forth in connection with a description of each circuit or group of circuits comprising a typical application of the invention to a certain class of device.

One advantageous use of the novel electrical circuit of the invention is in a charger device for small rechargeable cells such as those contained in a nickel-cadmium (NiCd) battery having an initial charging rate of 20 milliamps (ma), for example.

Referring now to the drawings in greater detail, FIG. 1 shows a battery charger circuit, generally designated 10, to include a plug 12 having prongs 14 and adapted for reception into a wall outlet 16 or other AC source, which, for purposes of illustration, will be considered capable of supplying 60 Hz AC at a 110 volt potential. A pair of leads 18, 20 are electrically connected to the plug terminals 14, and the circuit further includes a silicon bilateral switch 22, an inductor 24 forming the primary winding of a stepdown transformer generally designated 26 and having a ferrite core 28. A capacitor 30 is connected in series with the inductor 24, with the line 18 being thereby connected to one lead of the capacitor 30 and the line 20 being connected to the other lead thereof. The transformer 26 includes a secondary winding 32 which is center-tapped, as at 34 and which includes leads 36, 38 joined at the junction 40 and forming a single transformer/rectifier output line 42.

A pair of diodes 44, 46 are placed respectively in the lines 38, 40 and another or return line 48 extends from the center-tap 34. The load across the lines 42, 48 would in this application, typically be a number of NiCd battery cells in series, but this load is schematically indicated merely as a resistance 52 in FIG. 1. In one separate form of device, the switch 22 is a silicon bilateral switch or Shockley diode pair arranged in inverse parallel relation. Such a device is typically a four-layer, two-lead device of a known type. The capacitor 30 may be a 0.22 mmf and the primary and secondary windings are designed so as to provide the desired output power. The diodes would typically be 1N914 diodes.

The SBS selected for this device would have a turn on or breakover voltage of about 8 volts, for example.

Referring now to the operation of the charger 10, when the plug 12 is connected to the AC source 16, the 60 Hz 110 v. AC signal will appear across the load 52 as approximately an 8 v, 5,040 Hz, 20 ma current, for reasons which will now be discussed.

Referring now to FIGS. 1–3, and assuming that the voltage of the input signal 54 is at 0 and rising, or is in the first quadrant (I) of the waveform, the switch 22 will not conduct until its threshold is reached and, accordingly, for a finite time marked as interval "a" in FIG. 3, substantially no current will flow. When the voltage impressed on the forward lead of the SBS 22 rises to the threshold of 8 v., for example, the SBS becomes conductive, the effective voltage drop thereacross is greatly reduced, and current pulses rapidly through the inductor 24 and into the capacitor 30, where it is transiently stored.

It is because of the relatively rapid switching characteristics of the SBS 22, and the relatively small value of the capacitor 30, that the current passes through the inductor 24 as a rapid pulse. This action induces an opposite pulse of current in the secondary winding 32, from which the pulse passes through the diode 44 in the direction shown by the heavy arrow 57 in FIG. 1; this pulse then appears across the load 52. The time required to pass the pulse is very short in relation to the time shown as "a" in FIG. 3, being represented by whatever small horizontal component "c" the substantially vertical step portion "b" of the waveform 54 is shown to possess in FIG. 3. When the SBS conducts, it passes the current available from the input signal 54 having the sine wave configuration shown in FIG. 2. When the first pulse of current passes through the SBS, however, the voltage across the SBS then substantially immediately drops below the threshold voltage of the device, and essentially to 0.8 volts, typical of a forward biased diode. However, the voltage of the input signal is rising continuously, and within time interval $a_1$ in FIG. 2, another 8 volts will have built up on the SBS, again triggering it into conductivity. At this point, another pulse is rapidly passed through the primary winding 24 and this pulse is again stored in the capacitor 30. As this pulse passes through the primary 24, another pulse is induced in the secondary 32, and this pulse, having passed through the diode 44, again appears in the line 42.

In this connection, an important feature of this form of circuit of the invention will be seen, namely, that this second pulse passes through the same diode in the same direction as the first pulse, because the direction of current passage through the primary is the same for the second pulse as for the first pulse. After the SBS has permitted the second pulse to pass, with the SBS then seeing a consequent reduction of voltage below turn-on potential, the continually rising voltage again builds up with time as shown at $a_2$ in FIG. 3, and the cycle described above is repeated, with a pulse being passed each time the threshold voltage is reached and with the SBS remaining non-conductive whenever the voltage of the input signal is below the conductive threshold of the device.

Assuming, merely for purposes of illustration, that the switching voltage were exactly 8 v., that the peak voltage available in the line were exactly 168 v., and neglecting the voltage drop across the device, 21 pulses would be passed during the first quadrant (I) of the wave shown in FIG. 2. The frequency of the output signal appearing at the load 52 would therefore be 84 times the line or input frequency, i.e., 21 pulses for each of the four quadrants of the signal 54.

Referring again to FIGS. 2 and 3, it will be assumed that the voltage has reached the maximum positive value of 168 v. and begins decreasing, i.e., the signal is now in the second (II) quadrant. The voltage now appears across the SBS 22 in the same manner as before, but in the opposite direction, it being appreciated that the SBS in this exemplary device is assumed to consist of inverse parallel wired Shockley diodes or the equivalent. As the voltage decreases, each time 8 v. (or other threshold voltage) appears across the SBS, another pulse will discharge, this time from the capacitor 30 through the primary winding 24 and through the SBS 22. As each pulse passes through the primary 24 in this direction, a pulse appears in the secondary 32 as described earlier, except that, with the voltage falling, the direction of the current flow is that shown by the light arrow 56 in FIG. 1. Accordingly, all pulses resulting from the negative going voltage in the input signal 54 pass through the diode 46 rather than through the diode 44. The result is a signal with a plurality of positive pulses followed by a plurality of negative pulses.

Referring again to FIGS. 2 and 3, when the input signal reaches the maximum negative value, the voltage begins to rise from the maximum negative value through a series of reducing negative values, across the 0 voltage line, and toward the highest available positive voltage. During this time, the switch 22 is again intermittently passing current to the capacitor 30, inducing pulses in the winding 32 which move in the direction shown by the heavy arrow 57.

As a consequence of the foregoing, while the transformer secondary passes an equal number of pulses in each direction, it would, in the example given, pass 42 pulses successively in the same direction, then 42 pulses in the opposite direction before repeating transmission of another 42 pulses in the first direction. FIG. 3a shows a typical waveform of this type.

Again assuming the threshold and voltage to be 8 v. and the maximum AC voltage to be 168, the explanation for the 5,040 cycle output frequency will be appreciated. In other words, the input waveform includes four quadrants, and 21 pulses result from subdividing the input signal in each of the four quadrants. Consequently, the output frequency of a device made according to the invention is four times the ratio of the maximum AC voltage to the threshold voltage of the switch device.

As applied to a typical case, therefore, if the threshold or switching voltage were four volts, the device would switch twice as often, and the frequency would be twice as great; if the threshold voltage of the switch device were greater, the device would switch less often and the frequency would be lower.

Referring now to FIG. 4, the operating characteristics of a typical symmetrical bilateral switch device used in the invention is shown. From FIG. 4, it will be noted that, in the first quadrant, as the switching voltage $V_s$ increases, a very slight current flow takes place. As the switching threshold or breakover voltage is approached, the switching current $I_s$ begins to increase rapidly with respect to increased voltage (although the absolute value of the current flow is still in the order of microamperes). As the switching voltage is reached, the forward voltage across the device suddenly drops substantially immediately to the characteristic voltage drop across the device in the conductive state, typically 0.8 volts, and the current flow becomes substantial, rising very rapidly for an extremely small increment of increased voltage. The device will thus pass significant current and remain in the conductive mode until all available current has passed through the device.

Behavior in the third quadrant is the same as that in the first, except that the voltage values are negative values and the direction of current flow is opposite that in the first quadrant. FIG. 4 shows the performance of a symmetrical device; if the breakover voltage, the forward drop voltage, or other characteristic of the solid state device were not symmetrical, then the shape of the curves in the first and third quadrants would be characteristic of each device but different from each other. Reference will be made to such non-symmetrical devices elsewhere herein.

Referring now to FIG. 3a, the first or V device curve shows the voltage across the bilateral switch 22 in the circuit of FIG. 1, with time being shown as the horizontal axis. This curve is shown to possess three distinct regions, the first region 60 indicating a gradual rise of voltage across the device 22, such voltage rise corresponding to a portion of that of the input signal 54. When the voltage has reached the threshold $V_s$, it drops rapidly as shown at 62 to the level 64, where it remains until voltage build-up begins again.

Referring to the second line of FIG. 3a, marked $V_{primary}$, the voltage in the primary circuit is shown to be substantially zero in the region 66, where it remains until the voltage threshold of the device is reached and conduction begins. Thereupon, as shown in region 68, the voltage rises instantaneously to a level 70 characteristic of the device breakover voltage less the forward drop voltage. When the device ceases conducting, the voltage drops rapidly as shown at 72 back to the zero voltage region 66.

Referring to the third portion of FIG. 3a, the current $I_{primary}$ is shown to be characterized by a region 74 wherein no current flows, a region 76 in which current rises rapidly, and a region 78 in which current drops very rapidly back to the zero level 74.

The fourthline of FIG. 3a shows current flow in the secondary ($I_{secondary}$) to be characterized by a region of substantially no current flow 80, followed by a rapid rise region 82 and a region 84 of gradual decay over a measurable interval, back to the zero level 80. The difference in the wave forms $I_{primary}$ and $I_{secondary}$ is accounted for by the characteristics of the transformer, which in this case lowers the peak current but extends the duration of current flow.

Referring to the fifth line of FIG. 3a, the voltage on the capacitor $V_{cap}$, is shown to rise from substantially zero in the region 86 steeply or rapidly, as in region 88 to a plateau 90, followed by a second rise region 92 to a higher voltage plateau 94, and so on. The curve $V_{cap}$ demonstrates that the capacitor voltage continues to build up as each pulse of current is stored therein, and this behavior will continue until the positive-going voltage stops rising and beings dropping, whereupon the characteristic shape of the curve will be reversed and then resemble that of a descending rather than an ascending "staircase".

Reference will be made herein to the voltage and current characteristics of other forms of circuits embodying the invention as circuits of such types are described.

Another important advantage of the invention is that the voltage of the output signal is substantially independent of the voltage of the input signal. Further, where the threshold voltage of the switching device is known or made to be a certain precise voltage, then, the further advantage of a closely controlled output voltage and independence of input voltage may be obtained in the same circuit or device may be derived therefrom.

Illustrating the first point, assuming the switch device has a threshold of 8 volts, each pulse passed through the switch will have a potential of 8 volts. If the input signal is 120 volts, 15 8-volt pulses will result; if the voltage is 160 volts, 20 8-volt pulses will result, but in any case, each pulse will have a potential determined by the breakover voltage of the switching device. Accordingly, components in the circuit having a voltage level controlled by the device will see the breakover voltage of the device, but no greater voltage; the number or frequency of pulses only will change.

The importance of this feature for certain applications can be realized when it is appreciated that many commercial devices include constant voltage transformers which are provided by the manufacturers at extra cost as insurance against voltage fluctuations. Recently large city "brown outs" and "black outs" have convincingly demonstrated that voltage stability is not a reliable characteristic of even the most modern large scale power suppliers. An important advantage of the present invention, therefore, is that devices incorporating the invention produce an output which is substantially independent of input voltage.

Reference will now be made to a problem which is typically encountered in battery charging as well as in many applications wherein a DC power supply is used. Assuming that the threshold voltage of a device according to the invention is carefully selected, and the transformer is designed so as to produce a given output voltage, then the device will provide this output voltage with virtually no variation, even if input voltage varies considerably. The importance of this feature as applied to a battery charger is that, assuming the battery to have a given potential and to be charged by a device of exactly equal potential, no current will flow into the battery from the charger when the battery is fully charged. However, in most prior art devices, the charging potential is set higher than the battery voltage and the battery is charged until the current flow falls to a predetermined level or the cell becomes excessively hot. Switches, detectors and the like are provided as controls for this purpose in sophisticated chargers. If such controls fail, the battery will be damaged. If a prior art charger is set to the ideal potential but is not regulated, and the input voltage becomes too high, damage will result; if the voltage falls too low, the battery will not be fully charged. In devices of the present invention, the voltage can be selected exactly by selecting the switch voltage carefully and designing the transformer properly. The charger will then charge the battery to its exact potential and thereafter will not create additional heat by overcharging, since an exact equilibrium will be reached and maintained. As a consequence, rapidly rechargeable batteries as well as batteries requiring longer term charging cycles may be charged on the same device of the invention without fear of damage. In the prior art, placing a high rate charger on a battery subject to damage by overcharge would often be harmful, and therefore a different type charger was required for each type of battery, or complex and expensive chargers were required. Since an object of the present invention is to provide inexpensive simple chargers for small rechargeable batteries, this inherent characteristic of the invention is of great importance.

Referring now to this accurate regulation of voltage feature as applied to constant voltage power supplies, such devices are often connected to a line extending from the transformer secondary to the linear regulator with the line including a diode and a filter or a ripple eliminating capacitor. Because, in these devices, the output voltage must remain very constant, any excess voltage would have to be dissipated in the form of heat, and where the voltage was excessive and/or unstable this constituted a serious problem.

With the present invention, the capacitor eliminates ripples, but the power supply receives a highly controlled, very constant voltage and is not required to include components adapted to permit high heat dissipation, or to absorb voltage surges, or the like. Other aspects of power supply units and certain applications thereof are discussed elsewhere herein.

Referring now to another important advantage of those embodiments of the invention where a transformer is intended to be used, the size of the transformer may be made much smaller than the transformers used in prior art devices generally intended to perform the same or similar functions.

For example, in the case of transformers presently used with a power supply device which is in turn used to operate a small tape recorder or other battery powered appliance, a typical transformer would weight 3 to 8 ounces or more. A power supply device with equal capacity can be constructed, according to the present invention, wherein the transformer would weigh merely a small fraction of an ounce, with a corresponding reduction in cost being made available to the manufacturer or user. One of the reasons for the ability to reduce the size of the transformer relates to the fact that, according to the invention, a much lower voltage is supplied to the transformer. Moreover, a much higher frequency is used and, in addition, the duty cycle of the transformer is, in effect, much less than would be indicated merely by considering the frequency of the signal fed to the transformer primary.

As is known to those skilled in the art, each transformer has a characteristic, the so-called ET constant, which defines the relation between voltage (E), the time or duration of each pulse of current (T), and saturation of the transformer. Where the voltage is high, and the frequency is low (frequency and time are reciprocally related) the ET constant (a product of E times T) is high. A high ET constant indicates that relatively large amounts of core material and large amounts of conductor material are required to transform a given amount of power. Where more power is sought to be transformed than the core and the conductors can accommodate, the core becomes saturated and the transformer fails to function.

According to the equation, since the size of core and the size of conductor derive from and are directly related to the mathematical product of E and T, a reduction of either E or T reduces the product. Where both E and T are reduced, their product is greatly reduced, and where large orders of reduction of both factors are possible, then an extremely large reduction of their product results.

Where the product of E and T is exceptionally small, the overall size of the transformer can then be made exceptionally small. In the instant case, merely by way of example, this is realized by reducing the E or voltage term of the equation by some 50 times, for example, and by reducing the effective T term by an order of perhaps several hundred or more. While merely multiplying the frequency (1/T) of the signal being transformed would in and of itself reduce the T factor by the same relative proportion, the discontinuous nature of the pulses passed through the primary winding 32 of the device of the invention means that, in effect, the time factor is reduced even more than that accounted for by change of frequency alone. In other words, inductance occurs only when a pulse is passing through the primary. However, during a major portion of the time in which the apparatus is operating, measurable current is not flowing in the inductor, because the time during which the switch conducts current is extremely short relative to the apparatus output frequency. By way of example, FIG. 3 shows that duration "c" is very small in relation to duration "a", with duration "a" representing the time during which voltage build-up is occurring on the switch, and dimension "c" representing the time during which current is actually passing through the switch.

While the exact duration of the pulse will also be influenced somewhat by inductive and capacitive reactance accounted for by the inductor 24 and capacitor 30, respectively, and to a lesser extent by the inherent characteristics of the switch device 22 itself, the duty cycle itself is still a great deal less than would be indicated by considering frequency alone. As a practical matter, particularly in low power devices, the order of reduction in transformer size able to be achieved by the practice of the present invention is extremely dramatic. This constitutes a feature of the invention which is highly important in a large number of applications, both from the standpoint of cost and from the standpoint of compactness, light weight, and the like.

The capacitor which is placed in series with the switching device of the invention should preferably have certain characteristics, and the preferred manner of selecting the capacitor, with respect to its capacity as well as its operating characteristics, will be described elsewhere herein.

An apparatus such as that shown in FIG. 1 utilizes the novel primary circuit of the invention in conjunction with a relatively simple secondary circuit comprising a pair of diodes and a center tapped secondary winding. Such a device is typically adapted for use as a battery charger or other application wherein a pulsating DC current is acceptable for use.

It will be understood, however, that a primary circuit such as that shown in FIG. 1 may also be associated in use with other types of secondary circuits, each having its own particular advantages and characteristics, and a number of circuits of this type and their application to the present invention will now be described.

Referring now to FIG. 5, a secondary circuit generally designated 100 is shown to include a transformer core 102, a secondary winding 104, and four diodes, 106, 108, 110, 112 with a positive voltage output line 114 and negative voltage return line 116, a filter capacitor $C_f$ 118, and a load resistor $R_L$ 120. In use, this secondary circuit wil furnish an output signal with low ripple characteristics and one characterized by good transformer utilization. This device uses a single secondary winding for both half waves, but has a disadvantage in that four diodes are required, two each of which are connected in series. This causes a voltage drop which, while perhaps not large in some applications, may be significant where the voltage across the primary of the circuit is of a low order, perhaps two or eight volts for example.

A secondary circuit such as that shown in FIG. 5 will provide a secondary winding/rectifier/filter capacitor arrangement which may be useful as a power supply for a laboratory instrument, for an operational amplifier, for small calculators, or the like. A device of this sort may also be considered to act as a pre-regulator for use with a linear regulator for voltage or current where extremely precise output is desired. Devices of the type shown here, when used as a secondary circuit of power supply are advantageous when compared to prior art power supplies for the reasons described above in connection with the apparatus of FIG. 1. In addition, by reason of having very small transformer, the external magnetic fields created by the transformers are of a very low order, and the apparatus requires minimum shrouding or the like as a protection against undesirable interference with other magnetically sensitive laboratory equipment or the like.

Referring now to FIG. 6, a circuit similar to that of FIG. 5, generally designated 100A, is shown to include a core 102A, a secondary winding 104A, and a pair of diodes 106A, 108A. The secondary 104A is center tapped as at 110, and the output and return lines 114A, 116A are provided with a filter capacitor $C_f$ 118A shown to extend between them. A resistive load 120A is shown as extending across the lines 114A, 116A, A secondary circuit of this type provides full wave rectification and uses a center tapped transformer winding. This characteristic secondary circuit provides a low ripple output and moderately good transformer utilization. That is, each half of the winding is used only fifty percent of the time; however, this design needs only two diodes and accordingly has a lower voltage drop across the diodes than a four-diode design. This sort of secondary power supply provides perhaps the best configuration from the standpoint of performance in relation to cost. A unit of this sort is applicable for powering instruments, operational amplifiers, calculators, and the like, and has generally the same utility as an apparatus such as that shown in FIG. 5.

Referring now to FIG. 7, another form of secondary circuit generally designated 100B is shown to include a core 102B, a secondary winding 104B, and diodes 106B, 108B, 110B and 112B. In this design, the secondary winding 104B is center tapped, as at 113B, and this apparatus includes a positive polarity supply line 115B. A negative polarity return line 117B, and a ground line 119B. A filter capacitor 121B is connected across the lines 115B and 119B, and a second filter capacitor 123B is connected across lines 119B and 117B. First and second resistive loads RL1, RL2, 123B, 125B are shown with these loads being connected respectively across the lines 115B–119B and 119B–117B.

When used as a power supply, an apparatus such as that shown in FIG. 7 has a number of advantages. This apparatus provides a full wave rectification with dual voltage outputs, one positive and one negative. The apparatus has equal voltage and current capability at each output point, and such an apparatus is similar to that of FIG. 6, except that it provides good transformer utilization and good power capability as well as relatively ripple free signal output. A power supply can be made according to the invention using a secondary circuit of the type shown in FIG. 7, and such a power supply is applicable to a wide number of applications wherein both positive and negative voltage sources of measurable current are desired.

Referring now to FIG. 8, another typical secondary circuit which is useful with the invention is shown, and is generally designated 100C. In this device, a core will be understood to be provided, although it is not shown. The form of circuit shown in 100C includes a first or principal secondary winding 102C, a second or reference secondary winding 104C, a pair of diodes 106C, 108C associated with the first winding 102C, and a single diode 110C associated with the second winding 104C. The winding 102C is center tapped as at 112C, and a line 114C extending therefrom is joined as at 116C with a line 118C extending from the second winding 104C. A positive polarity output line 120C, a negative output line 122C and a common ground line 124C are provided in this device, which also includes filter capacitors 126C and 128C. Resistive loads RL1 designated 130C and RL2 designated 132C are shown as being connected respectively between lines 120C–124C and 124C–122C.

A device of this sort provides full wave rectification in the positive voltage portion of the circuit using the pair of diodes 106C, 108C, and provides a generally ripple-free positive polarity signal by reason of the provision of the capacitor 126C. The secondary winding 104C is normally a small winding providing a low power negative voltage which would commonly be used merely as a reference voltage. Accordingly, half wave rectification only is provided for economy, it being understood that load 132C would be relatively small. Such an apparatus is useful with the present invention and would typically be used for an instrument or the like requiring a reference negative voltage of low power and having a more substantial power requirement of positive polarity only. Needless to say, these polarities could be reversed if for some reason, this were desired.

Referring now to an important feature of the invention, inasmuch as the bilateral switch device of the invention, such as the switch 22 in FIG. 1, inherently has the capability of carefully regulating voltage in the primary circuit, is referred to elsewhere herein, the voltage supplied to any of the secondary circuits of the various apparatuses such as those shown in FIGS. 5–8, is inherently a voltage of a very highly stabilized value. Accordingly, it is possible to use secondary circuits such as those shown in FIGS. 5-8 for applications which might previously have required additional voltage regulation to provide functional advantages, circuit protection, or the like. Accordingly, the value of the inherent voltage regulating feature of the present invention and consequently the inherent freedom of the primary circuit from dependence on a stabilized supply voltage will be appreciated.

Referring now to FIG. 9, a secondary circuit generally designated 200 is shown. This circuit is shown to include a core 202, a secondary winding 204, center tapped as at 206, and a pair of diodes 208. A positive polarity supply line 212 feeds a linear voltage regulator unit 214, and a negative polarity return line 216 extends between one terminal of the resistor 218 representing the load and the center tap 206. A filter capacitor $C_f$ 220 is connected between the lines 212 and 216, and a reference line 222 extends between one of the terminals 224 on the regulator unit 214 and the return line 216.

The unit 214 is schematically indicated as being a regulator and comprises what is commonly known as a linear voltage or current regulator capable of providing a highly stabilized voltage/current output. Such regulators are used in a number of circuits wherein there is a requirement for a highly stabilized output, it being understood that devices will function to stabilize either voltage, or current, depending on the application in which it is used. An apparatus of the type shown in FIG. 9 will produce a highly controlled voltage, and will be very efficient in use, as will appear further herein.

Referring now to FIG. 10, another form of secondary circuit generally designated 200A is shown to include a secondary winding 202A which is center tapped as to 204A and which includes rectifying diodes 206A, 208A, 210A and 212A. A positive output line 214A and negative output line 216A are connected respectively to a ground or return line 218A through load resistors $R_{L-1}$, $R_{L-2}$, 220A, 222A, respectively. A pair of filter capacitors 224A, 226A are connected across the power lines to the ground line, and to reference lines 228A, 230A which extend between the ground line 218A and terminals of a positive polarity linear voltage regulator 223A and a negative polarity linear voltage regulator 234A; the regulator pairs are referred to as a tracking regulator arrangement when connected in this manner, as is well known to those skilled in the art.

The regulators in this arrangement are typically set to regulate the voltage across the load resistors at ±5 volts, ±12 volts, or ±15 volts, for example, or to another desired potential. The use of a circuit of this type is known when used with a conventional transformer, and such a circuit provides a high degree of control and ripple isolation. However, in prior art arrangements where the secondary winding sees certain voltage fluctuations in use, small to moderate amounts of heat must be dissipated in the regulators because they will not permit the voltage to rise above the control level, and excess energy must be dissipated by way of heat. By using a secondary circuit such as that shown in FIG. 10 with a primary circuit of the type shown in FIG. 1, the inherent ability of the primary circuit to limit voltage carefully means that the circuit as a whole shows very great and, in fact, almost perfect efficiency from the standpoint of lost heat.

It will be understood that the use of a tracking regulator arrangement in combination with the novel primary circuit of the invention provides significant advantages in use; performing the transforming operation at the high frequency and lower voltage made possible by characteristics of the SBS or the like make it possible to make such an arrangement very compact and light weight, as well as reducing the need to shield the magnetic components of the power supply unit as a whole.

As will be understood by those skilled in the art, modifications may be made to the type secondary circuit shown in FIG. 10 so that unequal positive and negative voltages will appear across the load resistors, for example some units provude a +5 and −12 volts; others is +15 and −15 volts; others provide +5, −9 output and still others a +3, −9 output, for example.

Referring now to FIG. 11, another relatively basic secondary circuit of the invention is shown here. The apparatus shown in FIG. 11 is a switch controlled signalling or noisemaker device generally designated 300 and shown to include an alternating circuit source 302, lead lines 304, 306, bilateral switch means 308 in the form of a solid state device of the type described in connection with FIG. 1, or other suitable device described herein, a capacitor 310 and a primary winding 312. The switch, capacitor and primary winding are arranged in series circuit relation. A core 314 is shown between the primary winding 312 and a secondary winding 316 forming a part of a secondary circuit, which includes leads 318 and 320. A switch 322 is placed in line 318 and a capacitor 324 is in series with the switch 322.

According to the invention, the primary portion of the circuit 310 operates in the same manner as the primary circuit shown in FIG. 1, that is, the capacitor 310 is charged stepwise by pulses of current which are passed intermittently through the primary winding 312 from the switch 308 as the switching voltage threshold of the device 308 is reached from time to time. As the line current voltage reaches a peak and then becomes a negative-going voltage, the capacitor 310 then discharges through the winding 312, creating a sequence or stream of pulse in the opposite direction.

When the switch 322 is closed, pulses of current pass therethrough and into the capacitor 324. In this form of the invention, the capacitor itself is a piezoelectric device which has been manufactured so as to act as a noisemaker when subjected to a varying voltage of a suitable frequency.

Referring now to capacitors of this type, one such capacitor would typically be made in a disc form, with the piezoelectric material forming a disc placed upon a brass substrate. While piezoelectric caapacitors of this type have been used in the past, particularly as parts of tuned circuits, for the purpose of acting as noisemakers or the like, and while the construction features thereof are known to those skilled in this art, a brief description of an example of one such typical capacitor will be set forth herein to illustrate the use of such capacitors in circuits of the invention.

Typically, the capacitor is made from a material having a high piezoelectric coefficient such as for example, a barium titanate ceramic material. This material, which is in crystalline form, is shaped into a disc having a thickness of about 0.006–0.015 inches and a diameter of 0.75 inches, for example. The crystals themselves are either sintered into a single mass or are held together by the use of a suitable binder. The disc thus formed is poled by exposure to a strong electrical field while immersed in hot oil, to raise the temperature of the crystalline material above the Curie temperature. The exposure of the material to the field orients the dipoles within the crystals forming the disc.

The thin, typically circular disc thus formed and poled is next electroded on the side which will not be bonded to the metal disc, by applying a conductive material over both faces thereof, typically by silk screening a conductive oxide or metallic coating thereover. If a metal disc is not used, then both sides are electroded. The coating is also a disc form, but terminates at an edge which is spaced inwardly from the edge of the disc of crystalline material to provide a margin of sufficient width to insure that the dielectric strength of the structure will be maintained at a suitable level.

After the disc of crystalline material has been poled and electroded, it is fastened, as by a conductive cement material, to a thin disc, typically a metal disc such as that made from a half hard brass of 0.003 inches thickness. The electroded ceramic disc of material is also arranged so as to leave a margin between the outside edge of the ceramic and the other circumferential edge of the brass disc. Next, an electrically conductive lead is attached to the disc at a node, that is, the point of zero or minimum movement during the deflection of the capacitor for noise making. The disc as a whole is then supported from either side upon an annular member having a knife edge arranged to coincide with the circular locus of node points of the disc. This permits the capacitor to deflect as described below with minimum energy loss and maximum acoustical output.

Inasmuch as the composite brass and ceramic disc is itself a capacitor, it is connected in the electrical circuit in a conventional manner, that is, with one lead being connected to the electrode material disposed on one side of the ceramic disc and the other electrode being connected to the brass portion of the disc. It will be understood that, with the electrode on the side of the ceramic disc facing the capacitor being in electrical contact with the brass, the two electroded portions of the disc form opposed plates of the capacitor with the ceramic material acting as the dielectric. The rating of such capacitor may range from about 0.1 mf. to about 0.001 mf.

In use, when the capacitor is energized, the poling of the crystals is such that the ceramic disc, upon being exposed to a voltage increment, expands and contracts radially, and being attached to the brass disc which does not undergo measurable dimensional variation upon application of current, the entire disc as a whole is deflected between convex and concave shapes, with such deflections occurring with the frequency equal to that at which the pulses of voltae are applied. When properly supported, a clearly audible and, in fact, relatively loud sound is emitted as pulses of current are applied to the capacitor.

This capacitor may if desired be placed in an appropriate housing, or may be associated with an acoustically resonant structure of a suitable type to insure that the noise created by the rapid change of dimensional variation with the capacitor is proprogated from the housing or enclosure.

Items of this sort may be used in smoke alarms, in door bells, or in other applications where it is desired to eliminate the cumberson signalling or noise making arrangements of the prior art. In some cases, a noise making device according to the present invention will replace an entire hammer and bell type system, and in other cases, such as those in which the piezoelectric capacitor is used as a noise making source, the circuit of the invention will greatly simplify the production of high frequency pulses required to cause acoustical actuation of the capacitor. According to the present invention, the capacitor is used as a part of the circuit but is not tuned to resonate with other components in the circuit as would be the case in prior art devices, inasmuch as there are no other devices required or provided to establish resonant conditions.

By reason of eliminating the transformer which was sometimes used in prior art devices, and/or by eliminating the need for inverters or other devices required to create high frequency, the invention represents a significant step forward in the annunciating, signalling and noise making areas.

While the apparatus of FIG. 11 is shown to include a manual switch, it will be understood that other means of switching the device on and off, including switches placed in the primary circuit or elsewhere, could be provided for this purpose, the device just referred to being described merely for the purpose of illustrating one application of the novel switch and capacitor circuit of the invention.

Referring now to FIG. 12, another embodiment of the invention is shown. The apparatus consists of an extremely simple circuit comprising an alternating current source 302A, a pair of leads 304A, 306A, a capacitor 310A, a bilateral switch device 308A and inductive means in the form of a coil 312A in series in the circuit just described. A speaker device 314A is shown to be associated with the winding 312A for purposes which will now be described.

In the operation of this form of unit, the $V_s$ of the switch device is selected so as to produce the desired audible frequency in the speaker. If the device were selected so as to resemble the apparatus described in FIG. 1, the frequency would be approximately 5,000 cycles per second; if it were desired to obtain a lower frequency, such as 2,000 to 3,000 Hz, then a switching device with a higher breakover voltage would be selected. In the operation of the device shown in FIG. 12, the pulses which pass through the switch 308A and reach the capacitor 310A passed through the speaker winding 312A creating a field which interacts with the magnetic field of the permanent magnet speaker 314A, causing the cone or diaphragm of the speaker to move and produce sound. The larger the size of the capacitor 310A, the greater its potential for energy storage, and the greater amount of energy which will be transmitted through the winding 312A, and accordingly, the greater will be the noise produced by the speaker 314A.

Referring now to FIG. 13, the most simple form of signalling device made according to the invention shown. Here, there is shown an alternating current source 302B connected by leads 304B, 306B to switching means in the form of a bilateral solid state switch device 308A in series with a capacitor 310A.

According to the invention, the alternating current taken from the source 302B is subdivided into lower voltage, higher frequency, pulses by the solid state switch 308B in the manner described in connection with the apparatus of FIG. 1. These pulses are impressed upon and subsequently discharged from the capacitor 310A, but the capacitor 310A in this case is a piezoelectric noise making type capacitor such as that described in connection with the apparatus of FIG. 11, or the equivalent thereof. In this case, no transformer is present, and the noise making function may be derived directly from an alternating current source, with the switch device 308B provding both the increased frequency and the pulsing action required to cause periodic deformation of the piezoelectric capacitor to produce a clearly audible noise. Selecting the breakover voltage of the device 308B and the capacitor 310A in conjunction with the magnitude of the AC source 023B is done with a view toward the frequency which is desired to be created, and the physical size of the noise making capacitor. The device is shown without a switch merely for purposes of illustrating the great simplicity which can be achieved by using devices according to the present invention instead of using inverters or other frequency changing devices which might otherwise be necessary for obtaining a suitale frequency.

Referring now to FIG. 14, another circuit which incorporates the principles of the present invention is shown and is generally designated 300C. This circuit includes an alternating current source schematically designated 302C. a pair of leads 304C, 306C, a first or line capacitor 308C, and a noise making capacitor 310C, arranged in a line 312C in parallel with a second line 314C which extends between the one AC line 304C and the other line 306C, with line 314C including the solid state bilateral switch device 316C. In this arrangement, it will be noted that the noise making capacitor 310C is in parallel rather than series relations to the solid state switch means 316C. Accordingly, assuming that the capacitor 310C has a small value and a high impedance, placing it in shunt or parallel relation with the switch means that one terminal of the capacitor 310C will see the voltage impressed on the switch 316C and the voltage on the small capacitor 310C will rise at the same time the voltage across the solid state device is rising; when the threshold voltage is reached, the device will conduct and the pulse of current flow to the capacitor 308C. At the same time, the charge on the capacitor 310C will discharge to the switch in parallel therewith, and when the switch 316C ceases to conduct and voltage thereon begins to build up, the capacitor 310C will again be charged, thus, if made sufficiently small, and placed in the parallel relationship shown, this capacitor will be charged and discharged each time the switch opens and closes and in effect it will see the same frequency which appears between the switch 316C and the capacitor 308C. The noise making capacitor may be the same as the type of capacitor noisemaker used in the apparatus shown in FIGS. 11 or 13 or the equivalent thereof.

Referring now generally to FIGS. 15-18, two additional embodiments of noise making devices are shown, which illustrates the versatility which can be obtained by the use of the present invention, particularly as the apparatus including the circuit of the invention are intended for diverse purpose.

Referring first to FIG. 15, a circuit generally designated 500 is shown to receive energy from an alternating current source 502 and includes leads 504, 506 extending to either side of the source. The lead 506 is connected to one terminal of a noise making capacitor 508 and the other terminal of which connects to junction 510, from which a pair of conductors 512, 514 extend respectively to a solid state switch 516 on the one hand and a diode 518 on the other hand, with the lines 512, 514 joining the line 504 at junction 520.

While this apparatus resembles the apparatus shown in FIG. 1, it will be noted that two important differences are present. First, the solid state switching device 516 need not be a bilateral switch but may be a unilateral switch; that is, it will pass current in one direction only. The diode 518 is adapted to pass current in the other direction. Accordingly, in the use of this device, when the alternating current signal appears as a positive-going voltage in line 504, the switch 516 will periodically conduct pulses from the junction 520 into the capacitor 508 to the line 514. As each pulse is passed through the switch it is stored on the capacitor 508. When the peak positive-going voltage has been reached, and the potential at point 520 begins to drop, the diode 518 becomes forward biased by reason of the existence of a higher voltage on capacitor 508 than is instantaneously present in the line and at point 520.

Accordingly, the capacitor 508 will be discharged through the diode 518 until the negative-going voltage has reached its lowest level. Inasmuch as the switch 516 is unilateral, it will not conduct from the capacitor 508 to the junction 520, and accordingly, the charge stored on the capacitor 508 will discharge through the diode 518.

Referring now to FIG. 16, the electrical behavior and implications thereof will be discussed. First, on FIG. 16 shows a staircase formation generally designated 522 consisting of a plurality of individual vertical steps. The curve also shows a region 524 in the form of a smooth curve extending from the uppermost step 526 in the staircase 522 to the lowermost step 528 in the following staircase 530. FIG. 16 illustrates the build up of the voltage stepwise across the switch 516 with each increase of voltage in an amount equal to the breakover voltage of the device being one step, eight volts for example. Each time an 8-volt potential builds up across the device, it conducts rapidly and voltage beginning building up thereon again, with the voltage gradually building up and then suddenly discharging. The behavior of this circuit during the positive going portion of the voltage build up is similar to that shown in FIGS. 2 and 3. However, when the voltage reaches a maximum positive value, then the voltage begins dropping, and, inasmuch as the diode 518 is not a threshold device, it merely discharges the charge thereon and is passed through the diode 518 as rapidly as the negative-going voltage in the line 504 will permit. Once the minimum negative-going voltage has been reached, as at 528, the voltage begins building up again. However, since it cannot pass through the diode 518 in the reverse direction, it is forced to go through the switch 516, which happens in periodic pulses.

The implications of the foregoing as far as the noise making capacitor 508 is concerned, is that the pulses represented by these stair steps in the staircase 522 will actuate the noise making capacitor at whatever frequency is provided, let us say for example, at a frequency of 2,000 cycles per second. When the apparatus switches into the mode wherein the discharge of the capacitor 508 occurs through the diode 518, as represented by curve 524, there is no stepwise discharge of the capacitor 508 and accordingly, the capacitor 508 does not emit an audible sound. Consequently, the sound produced by the device of FIG. 15 is an intermittent sound consisting of periods of 1/120th of a second duration during which time a 2,000 Hz frequency is heard and alternate 1/120th of a second periods in which no sound is heard. A rapidly interrupted, 2,000

Hz sound is thus created which is more arresting than an uninterrupted 2,000 Hz tone. As pointed out, the 2,000 Hz frequency is selected merely by way of example and without any implication that another frequency might be more desirable. Exact frequency is designed into the circuit by selecting the threshold of the switching device 516 in relation to the anticipated voltage and frequency of the line signal.

Referring now to FIG. 17, an electrical apparatus generally designated 500b is shown to be similar to the apparatus of FIG. 15 and to include alternating current source 502b and a pair of lines 504b, 506b connected respectively to the source 502b and junction points 510b, 512b. A unilateral switching device 514b is in the line 516b extending between the points 510b, and 512b, while another unilateral switching device 518b is in the line 520b extending between the points 510b and 512b. A capacitor 508b having a noise making capability is connected into the line 506b. The dotted lines enclosing the area 528b schematically show that the devices 514b, 518b are typically embodied in a single unit or package and comprise solid state unilateral switching devices. In this form of apparatus, the device 514b has a first threshold, for example, 8 volts and the other device 518b has a second, lower threshold, for example, 4 volts.

Referring now to FIG. 18, a voltage/time waveform is shown which illustrates the principle of operation of the invention. The "staircase" 522b shows the gradual voltage buildup and rapid switching of the switch device 514b, with the number of steps in the staircase indicating the number of times the basic line frequency is subdivided. In the example shown, the staircase 522b has 8 steps or subdivisions in each of the first and fourth quadrants; this number being shown for illustration only. A descending "staircase" 526b is shown in the area of the second and third quadrants, and will be seen to be characterized by smaller steps or subdivisions.

Referring now to the operation of the device of FIG. 17, assuming a positive going signal to appear at point 510b, it will pass through the device 514b in the direction shown by the arrow adjacent thereto each time the 8 volt threshold is reached. Because the device 518b is unilateral and connected in antiparallel relation to its counterpart device 514b, current will not pass therethrough while the voltage appearing at point 510b is a positive-going voltage. Each time a pulse of current passes the switch and is impressed upon the capacitor 508b noise is emitted. When the capacitor 508b is charged to the full line voltage (minus the forward drop of the device) appearing at 510b, the voltage at 510b begins to become a negative-going voltage. Accordingly, the capcitor 508b will discharge through the device 518b, but not through the device 514b, which will not at moderate voltages conduct current in the direction shown by the arrow adjacent the device 518b. This action continues until the negative-going voltage at 510b reaches a low point, as represented by point 524b in FIG. 18.

In operation, the apparatus of FIG. 17 is the same as that of FIG. 15, except that, during the negative going portion of the signal, a higher frequency is emitted by the capacitor 508b, because it is being discharged stepwise at a higher frequency than the frequency at which it was charged. In other words, with the charging and discharging frequencies being controlled by two different devices, each having a different switching voltage, the different subdivisions of the input signal will create two different frequencies. As applied to a signalling or noise making operation, this means that part of the output waveform will be characterized by one frequency and another part by another frequency. Consequently, the audible characteristic of the signal will be such that two different ringing tones will be heard in a rapidly alternating sequence. Stated otherwise, there will be two different, interrupted audible frequencies generated, each one alternating rapidly with the other.

Referring now to another signalling or noise making application of the circuit of the present invention, FIG. 19 shows an apparatus, generally designated 600, which is somewhat similar to the apparatus of FIGS. 15 and 17 insofar as it includes an alternating circuit source 602, leads 604, 606, a bilateral switching device generally designated 608, and also a capacitor 610 and a coil 612 in series with each other and with the device 608. The apparatus is shown to further include a rod 614 of a specially constructed material having an end portion 616 lying closely adjacent the periphery of a bell or like device adapted to make a ringing sound when struck. In this apparatus, the AC signal supplied by the source 602 is subdivided by the switch 608 into a plurality of pulses which are fed through the winding 612 and stored in the capacitor 610 during the positive-going portion of the input signal, and discharged from the capacitor 610 from the winding 612 under control of the switch 608 during the negative-going portion of the signal. The rod or bar 614 is made from a magnetostrictive material, that is, a material which changes dimensions when acted upon by a magentic field. According to the invention, the rod 614 is placed adjacent or within the coil 612, which receives intermittent pulses by reason of being in series in the switching capacitor circuit. Contraction and elongation of the rod or "slug" of magnetostrictive material causes the end portion 616 of the rod 614 to strike the bell 618 and produce an audible signal. The magnetostrictive device 614 may, if desired, be mounted solidly at one end thereof, because as it acts by internal expansion and contraction and need not have both ends free in order to function.

In operation, as the coil 612 is excited rapidly under the influence of the relatively high frequency current, a ringing noise is created, the frequency of which is generally determined by the characteristics of the bell 618. The intensity with which the bell 618 is struck depends both upon the magnetic force applied to the rod 614 and the relative magnetostrictive coefficient of the rod material. In any case, sufficient force can easily be applied by the use of the invention to make a clearly audible bell signal for a telephone or other device.

Reference will now be made to another aspect of the present invention. In the examples referred to above, the nature of the switching device was such that a plurality of positive pulses of current would result from the subdivision of a positive going waveform into a plurality of lower voltage individual pulses. Consequently, an output waveform such as that shown in FIG. 3b, or in some cases such as that shown in FIG. 21, would result, namely, a series of positive pulses followed by a series of negative pulses, another series of positive pulses, etc.

While such an arrangement is satisfactory for a number of purposes, including the purposes specifically referred to herein and others, it is sometimes desired, for considerations of transformer efficiency, to create a alternate positive and negative going pulses such as those shown in FIG. 22. In such an application, the advantages of a simple means of creating a higher frequency are maintained, but the further advantages of better transformer core utilization can also be gained. The manner in which this can be done while applying the principles of the invention is illustrated in FIG. 20, wherein there is shown an electrical apparatus generally designated 700 and shown to include an alternating current source 702, a pair of output lines 704, 706, a series capacitor 708, and a modified switching device enclosed in dotted lines and generally designated 710. The line 704 extends between a terminal 712 and the power source 702, and the line 706, which includes the capacitor 708, extends between the source 702 and the center tap 714 of the primary winding 716 of a transformer generally designated 718. The switching device 710 includes a first bilateral switch 720 and a second bilateral switch 722, with a flip-flop 724 being operatively connected between the switches 720, 722. Lines 725, 726 respectively connect the switches 720, 722 to the respective ends 728, 730 of the winding 716 and to the terminal 712. The transformer 718 also includes a secondary winding 732 which is center tapped, as at 734, and which includes first and second diodes 736, 738 arranged in a manner similar to that of the counterpart devices shown in FIG. 6, for example. A filter capacitor 704, and a resistive load $R_L$ generally designated 742, arranged as shown, complete the secondary portion of the circuit comprising the apparatus 700. It will be understood that the load may be any suitable load that the filter capacitor 740 and the connections thereof are made as described in connection with other embodiments of the invention shown herein, it being also understood that such secondary circuit is shown in this connection merely by way of exemplifying a typical application of the circuit.

Referring now to the operation of the circuit, it will be understood that the flip-flop 724 is of a type which will alternately enable and disable the bilateral switching device 720, and will perform a similar function for the bilateral device 722. Consequently, when a positive going voltage appears at the terminal 712, the device 720 will be in a conductive state, but the device 722, which is parallel therewith, will be in a non-conductive state because it is rendered non-conductive by the flip-flop 724. The pulse of current passing the device 720 will be a positive pulse in the line 724 which will pass through the center tap connection 714 into the lin 706 and thence into the capacitor 708. The flip-flop 724 is arranged so that after conduction has taken place in the device 720, and it is subsequently switched off, the flip-flop will enable the device 722 to conduct and disable the device 720 from conducting. Accordingly, when the voltage at the terminal 712 reaches the threshold of the device 720 it will switch on and pass current through the line 726 and through a portion of the primary 716, in a direction opposite to that passed by the pulse in the line 725, this pulse will pass from the center tap 714 through the line 706 and into the capacitor 708. When the device 722 passes into non-conduction, the flip-flop again enables the device 720 and disables the device 722, with the result that each alternate pulse is fed through the primary winding 716 in an opposite polarity sense.

When the voltage at the terminal 712 becomes negative-going instead of positive-going, the capacitor 708 discharges through the primary 716. However, it discharges alternately through the devices 720 and 722 because the flip-flop 724 again alternately enables and disables each of the devices 720, 722. Accordingly, the devices are bilateral but each operates only every other time, and as a consequence, the combination of the flip-flop action and the center tap arrangement of the primary windings creates an output wave from such as that shown in FIG. 22, namely, with the creation of alternate positive-going pulses P+ and P− as shown therein.

Referring now to another embodiment of the circuit and apparatus of the present invention, FIGS. 23–23b show various configurations of a form of apparatus to be used in conjunction with a telephone to provide a simplified telephone signalling system. As shown in FIG. 23, a circuit generally designated 800 is shown to include a typical telephone set schematically represented as 802 and shown to be connected across leads 804, 806. Placed in parallel to the telephone set is a series circuit which includes a bilateral voltage sensitive, preferably solid state switch unit 808, a speaker or voice coil 810 operatively associated with a speaker 812, and a series capacitor 814. In the embodiment shown, it will be assumed that the leads or wires 804, 806 supply the ringing current which is provided to signal a telephone subscriber that an incoming call is present.

Referring to FIG. 24, there is shown a schematic view of such a voltage/time diagram representing the ringing operation of a typical prior art telephone. The normal telephone is supplied with a steady or battery type direct current which may be either a plus or minus 48 volt direct current power shown as 816. When it is desired to ring the telephone during an interval $T_{ring}$, a 20 to 30 Hz signal of 65 to 110 volts AC is superimposed on the 48 volt DC potential, resulting in a ringing wave 818. Inasmuch as the ringing occurs intermittently, there is a period designated $T_{off}$ during which time ringing current is not supplied to the phone, after which ringing current is again furnished in another burst. In a conventional telephone, the ringing current is impressed upon a rather heavy and expensive noise making unit comprised of a bell, a striker, a pair of coils or windings, a DC voltage blocking capacitor, etc.

According to the present invention, when the ringing current is sent to the telephone, the bilateral switch 808 subdivides the current into a plurality of pulses as explained in connection with the other embodiments herein, feeding such pulses of current through the winding 810 into the cpacitor 814 during the positive-going portion of the ringing current and discharging it from the capacitor 814 through the winding 810, and through the switch 808 back into the line 804 during the negative-going portion of the ringing signal. In one form of circuit made according to the invention, the winding or inductor 810 is operatively associated with a speaker or the line 812 which makes an audible tone in the same manner as that described in connection with the apparatus shown in FIG. 12, with the only exception being that such ringing is intermittent in keeping with customary telephone practice.

By using the apparatus of the invention, certain other advantages derive in addition to those obtained by the reduction of cost and weight in comparison to prior art ringing devices. In the first place, the apparatus may be made completely free of mechanically moving components, and may thus anticipate a long life. The provision of the capacitor 814 not only provides the transient storage for the pulses of current controlled by the switch 808, but this capacitor also isolates the 48 volt or other DC potential from the ringing or signalling circuit portion of the phone.

Referring now to FIG. 23a, a similar arrangement 800a is shown as comprising leads 804a, 806a, a series capacitor 814a and a switch 808a. In this case, the capacitor 814a is a noise making capacitor similar to that shown and described in connection with the description of the apparatus of FIGS. 11, 13 and 14, for example. In this case, instead of using an inductive coupling and a speaker to provide the noise, the sound or signal emenates directly from the piezoelectric or like capacitor 814a. The capacitor also serves to isolate the ringing current and voice paths, and acts as a safety device by isolating from the ringing circuit the DC current which is furnished to the telephone.

Referring now to FIG. 23b, a similar apparatus 800b isshown to include connectors or lines 804b, 806b, having in series therewith a bilateral switch 808b and capacitor 814b. This apparatus also operates in a similar manner and is constructed in the same way except that the capacitor 814b is in reality a beam bender type piezoelectric type capacitor, that is, a capacitor comprised of a pair of oppositely poled, rectangular plates or beams 824b, 826b laminated together.

In this form of unit, application of the varying electrical field to the adjacently disposed piezoelectric elements 824, 826 causes one unit such as the leaf or beam 824 to undergo longitudinal compression while the other beam or leaf 826 undergoes longitudinal expansion. With oppositely directed beams respectively attempting to shrink and expand, the end portions 828 of the beam tends to deflect rapidly between the extremes as the field changes. Accordingly, the end portion 828 of the beam unit will intermittently strike the bell 830, causing it to ring.

While this form of apparatus creates another form of signal, in all cases shown in FIGS. 23, 23a and 23b, the principles of subdividing the voltage and using a unilateral or bilateral switch and a capacitor in a series circuit are applicable. This arrangement provides simplicity, multiple use of single components, isolation of direct current and isolation of the signalling and voice paths, all of which are required for satisfactory telephone service.

Referring now to FIG. 25 (sheet 2), another form of apparatus which is generally designated 900 is shown, with this apparatus illustrating the use of the principles of the invention as applied to a light emitting source. FIG. 25 shows a bilateral switch 902 disposed in series in a primary circuit comprising first and second conductors 904, 906, attached to a plug 908. The circuit includes a primary winding 910 and a capacitor 912 in series with the winding 910 and the switch 902. A core 914 forms a portion of a transformer generally designated 916 and shown to include a seondary winding 918, a control switch 920, a light emitting diode 922, and a second diode shown in dotted lines and numbered 924.

According to the invention, the bilateral switch 902 subdivides a current received from an alternating current source with which the plug 908 is associated, creating a plurality of pulses in the primary winding 910 of the transformer 916, these pulses being stored in the capacitor during the positive-going portion of the alternating current wave and being discharged back to the line through the switch 902 during the negative-going portion of the cycle.

This action causes an equal and opposite current flow in the secondary 918, and assuming that the switch 920 is closed, the current passes through the light-emitting diode 922 in pulses, causing the diode to be illuminated.

In the form shown, when the pulses of current are passing in the opposite direction, they may be discharged into the line through a second, conventional diode 924. With the arrangement of the invention, particularly bearing in mind that, in relatively low power applications, the duty cycle of the light emitting diode is very small, a very economical method of providing low voltage illumination is achieved.

Devices such as this are highly useful in applications which range from the display panels of machine tools or other light or control panels, warning indicators, or illuminators, to household articles such as coffee pots or the like.

At the present time, it is common for small signal type lights used with machines and the like to be provided with their own associated transformers and use low voltage light bulbs as a method of providing a signal. These transformers, because of the low frequency of conventional current, and this high duty cycle, have a relatively high ET constant and must be made large and consequently tend to be relatively expensive. However, such transformers are also used so as to isolate the high voltage used in running the machine or apparatus from the vicinity of the control panel, thus keeping the hazardous high voltage electricity away from the operator.

According to the present invention, such an apparatus can provide the advantages of great miniaturization, high voltage isolation, and low cost without sacrifice of illumination. The light emitting diode such as those shown in 922 can accommodate relatively high current provided the current is applied to the diode in very short "spike", that is, as long as the diode has a low duty cycle, it can accommodate much higher current than it would normally be otherwise able to withstand. Since the intensity of the diode depends upon the applied current, and since a person viewing the diode will not physically notice that the diode may be actually turned off for a major portion of the time, such person visualizes the diode as being continuously on, even though this is not actually the case. Accordingly, devices made according to this general concept of FIG. 25 are useful in many applications wherein low voltage illumination is required to be derived from a high voltage supply and wherein significant economy is desired. Such a device is much more advantageous than even a combination of small incandescent lamps and transformers or the use of neon bulbs or the like, which are fairly common in many appliances.

Referring now to FIG. 26, another illuminating device generally designated 900a is shown to include leads 902a, 904a, a series capacitor 906a, and an illuminating unit generally designated 908a and also shown to be in series with a solid state, voltage sensitive bilateral switch 910a. In this form of device, when the switch 912a is closed, the signal is fed directly to the bilateral switch 910a which subdivides the current into a number of pulse streams, one pulse stream having a positive polarity and the next having a negative polarity, and so on. With the size of the capacitor 906a being properly selected, the individual diodes 914a, 916a, are illuminated, one for the positive-going series of pulses and the other for negative-going series of pulses. The use of anti-parallel wired diodes thus provides constant illumination.

A device such as this is suitable for use where transformers are not normally provided, such as to replace the neon bulbs or the like found in coffee pots, waffle irons, or the like. When utilized properly, light emitting diodes have an exceptionally long life compared to articles such as neon bulbs and the like, in which the cathodes gradually disintegrate and blacken the envelope, in which the voltage requirement for firing gradually increases, and which possess other disadvantages in use.

Referring now to FIGS. 27–29, another embodiment of the invention is shown. In this form the invention comprises a battery charging circit embodied partially within a battery powered electric appliance and partially within a receptacle for the appliance, with the receptacle being designed to receive the appliance and orient it into a desired position without being electrically connected directly thereto. In the form shown in FIG. 28, the invention is embodied in an appliance receptacle generally designated 1000 and an appliance generally designated 1002. In this case, the appliance 1002 is shown to be a "pocket pager" or like signalling device adapted to receive a radio signal and indicate to the wearer that he should call his office or take some other action. Typically, such a paper or other unit 1002 includes nickle-cadmium or other rechargeable batteries, and in this case, the unit is shown to include a body portion 1004 having a top surface 1006 which includes a speaker 1008, a switch 1010 and a volume control 1012 for example. The receptacle 1000 is shown to include a small housing 1014 for the switch, primary winding and capacitor circuit, components to be referred to in detail later, and to accommodate an end portion of a cord 1016 extending therefrom and terminating in a plug 1018. Appliance receptacle walls 1020 define an open cavity 1022 of a shape corresponding to that of the appliance 1002 and which shape is preferably other than square so as to facilitate orienting the pager 1002 therein in a desired position of use.

According to the invention, one portion of the circuit, generally designated 1025 is received in the receptacle 1000 and another part, generally designated 1027, is received within the appliance. The receptacle circuit portion is shown to include means 1030 for attachment to a source of alternating current, a bilateral switch 1032, a series capacitor 1034, a primary winding 1036, and a portion 1038 of the core 1039 of a transformer unit. It will be understood that the portion 1025 of the circuit is functionally the same as the counterpart portion of the circuit of FIG. 1. The right hand or appliance-based portion of the circuit is the same as the right hand portion of the circuit of its counterpart in FIG. 1, and is shown to include a portion 1040 of the transformer core, a secondary winding 1042, diodes 1044, 1046, a common terminal 1048, a center tap 1050, and a resistive load 1052 disposed therebetween. From a consideration of FIG. 27, it will be seen that when the circuit is energized, pulses of current passing through the switch 1032 to the capacitor 1034 will also pass through the primary winding 1036 thereby energizing the secondary winding 1042. The pulses in the secondary winding are subsequently rectified by the diodes 1044, 1046 and are thereafter fed to the resistive load 1052, which, in this case, would be one or more cells of a battery used to power the appliance 1002.

In the embodiment of FIGS. 27-29, however, the windings 1036 and 1042 are physically separate from each other, and each winding has associated therewith, its own core portion 1038, 1040, respectively. Referring to FIG. 29, there is shown the body 1004 of the appliance 1002 with the half core 1040 being shown as comprising a lower portion thereof, with a distributed of flat winding 1042 shown to lie just therebeneath and to occupy a substantial area, with non-magnetic bottom wall 1054 being shown as forming the bottom part of the appliance 1002.

Assuming for purposes of illustration that these parts are assembled, the bottom wall 1054 would typically be a thin non-magnetic material of at least moderate dielectric strength, such as a plastic sheet material, supporting a coil 1042 immediately overlying it. A portion 1040 of the core, typically made from a thin sheet of magnetically permeable material would immediately overlie the coil 1042. In actual practice, the three layers comprised of the core 1040 and the coil 1042 and the bottom 1054 would be very thin, such as perhaps 0.015 to 0.100 inches in thickness, for example.

Referring again to FIG. 29, it is shown that the bottom wall of the receptacle 1000 would typically comprise a top element 1056 receptacle 1000, with the bottom wall, generally designated 1060 in FIG. 28, being shown to further comprise the distributed or spaced windings of the primary winding 1036, with a portion of the core 1038 lying just therebeneath and with the surface of the wall 1060 being in turn comprised of a flat sheet of non-magnetic material having at least moderate dielectric strength.

Accordingly, each of the walls of the receptacle and the appliance which lies adjacent each other in use would comprise a sandwich construction having primary and secondary windings respectively disposed therein, and each winding would have a portion of the core associated therewith.

Referring now to the normal operation, and to certain advantages of such an apparatus, when it is desired to charge the batteries in the appliance, it is merely necessary to place the appliance in the receptacle and plug the receptacle in. It is not necessary to remove the batteries from the appliance or to provide any galvanic or other direct electrical connection between the appliance and the power source. All of the energy required to recharge the battery is provided through the purely inductive coupling between the primary and secondary, which are located respectively within the receptacles and the appliance. Besides their rectifying function the pair of diodes 1044, 1046 in the circuit portion 1027 also serve to prevent the battery from discharging through any part of the charging circuit.

In the preferred form of invention, because the voltage is carefully stabilized by the inherent operation of the switch 1032 and the precise selection thereof so as to switch at a virtually exact, preselected voltage, the battery 1052 in the appliance does not tend to overcharge. This, in turn, creates greater reliability and an increased life expectancy for the battery and also for the appliance. While the concept of charging battery powered appliances without a direct galvanic or other direct electrical connection thereto is not new per se, the ability of the present invention to utilize a tiny, high efficiency tranformer powered by a high frequency signal created by the frequency-increasing feature of the invention makes the inductively coupled charging circuit extremely attractive in terms of cost, light weight, compactness, etc.

The appliance and receptacle are shown as having a complementary shape for simple "foolproof" orientation purposes, but it will be understood that this function could be provided in some other manner, such as providing optical aligning indicia, registration pegs, slots or grooves, etc.

In other cases, such as where the transformer windings are in the form of a circular or square or slightly rectangular spiral, orientation of the device may not even be necesary.

Referring now to certain aspects of the various forms of apparatus referred to just above, most of these embodiments of the invention do not use significant power. As pointed out in connection with the above discussion of FIG. 3a, the switching device does not function in a conductive mode during a major proportion of the time that the device is being operated. By way of further explanation, and referring again to FIG. 3a and to the descriptipon thereof set forth herein, as the voltage of the incoming AC signal builds up and approaches the threshold or switching voltage of the device, only trace amounts of current are flowing and, for practical purposes, the current flow is zero. As the switching voltage is reached, however, the voltage drop across the device is greatly reduced and a pulse of current will flow. Assuming the device to be a solid state device such as the SBS referred to, the device is triggered into conduction by the presence of a certain voltage, but, when current flow begins, the device will remain conductive only as long as a significant amount of current continues to flow in the device. This current may simply be referred to as the holding current, $I_h$, and the holding current for any individual device is a characteristic of the device itself. Consequently, a device with a high holding current requires the presence of a high current to remain conductive, and a device with a low holding current requires a smaller current to remain conductive. Whenever the current present in the device is less than the characteristic holding current, the device turns off or ceases to conduct. Reference to this characteristic of electronic switches appears elsewhere herein.

Referring now to the factors which affect the flow of current through the device, these include the various electrical effects present in any circuit. The presence of resistance reactance, etc. will affect the amount of current which will flow in the circuit, as well as establish the waveform or shape of pulses of varying amounts of current.

In the simplest form of apparatus or circuit, for example, the characteristics or waveforms of the current are determined only by the capacitor in series with the switch, such as the capacitor 30 in FIG. 1. If the capacitor is large, the initial current flow into it will be high and, since a discharged capacitor initially appears to current flowing into it as a short circuit or zero-resistance portion of the circuit, it, the current will initially flow rapidly into the capacitor, and, as the charge on the capacitor increases, the rate of current flow will decrease. The amount of current flowing with time as the capacitor becomes charged gradually becomes less and less. Accordingly, the length of time required for a pulse of current to flow into the capacitor will depend, at least to a certain extent, on the value of such capacitor and upon the existing charge thereon .

In addition, the length of time during which the current pulse will flow may depend upon other components of the circuit in series with the switch and capacitor. In this connection, assuming that an inductor such as the primary winding 24 in FIG. 1 is present, such a winding will provide inductive reactance, that is, it will resist increase or decrease in current flow therethrough and will tend to extend the length of time required for a pulse to flow into the capacitor. Inasmuch as the external load is inductively connected to the primary winding 24, the external load will be reflected to the winding 24.

Accordingly, inductive and capacitive reactance, as well as series resistance accounted for by wire losses, the voltage drop across solid state devices, and the value of other series resistance elements, for example, will combine to establish current values and characteristics, and will account for the shape of various voltage and current pulses within the circuit itself in operation.

As referred to above in connection with the applications or circuits in which little power is used, FIG. 3a illustrates such typical situations, and shows why power use is small, namely, because the device is in a conductive state for only a very short time, the voltage is relatively small, such as four to eight volts, for example, and because current flow takes place in pulses of short duration. Accordingly, most of the components of the apparatus as a whole are in a relatively quiesecent state for a major part of the time when the unit is being used; the device does not conduct for a major part of the time because a certain amount of time is required for the relatively high voltage (eight volts, e.g.) to build up thereon and, the device being responsive to continued current flow, it rapidly passes into non-conduction because the current flow therethrough occurs over such a short interval. Therefore, in any circuit wherein the device has a relatively high switching voltage, and wherein other circuit considerations are such that current flow takes place rapidly, little power will actually be handled by the device.

On the other hand, much higher power can be handled by a circuit wherein the switching voltage of the device is low and the holding current is relatively high.

The present invention is also applicable however, to such higher power applications, a number of which may have the same end use of the devices illustrated above and others of which may be of a different character entirely. For example, a battery charger can be made with a switching device of a type described herein which is adapted to handle significant amounts of power, such as 5 to 30 watts or perhaps more, just as other battery chargers of the invention might produce power of a fractional watt order or power up to 5 watts, for example. As will appear, not only the silicon bilateral switching devices, but other devices of various forms can be used in apparatuses intended for higher power outputs; the details of such switching devices will be referred to elsewhere herein.

In such increased power devices, the switching device will switch on when the voltage impressed thereon is relatively small, meaning that the device need spend very little time awaiting voltage build-up thereon. When the device becomes conductive, it will remain conductive only when a relatively high current is passing therethrough. In this manner, the device will not "waste time" remaining conductive when currents of a small order are passing therethrough, but instead, the device will switch off, permitting voltage thereacross to begin building up again. With this in mind, the secondary circuit can be designed to accommodate greater current flow. This, in turn, can be accomplished by enlarging the size of the series capacitor such that it will accept a higher current flow into it for a relatively longer time period. The inductive elements of the circuit are designed so as to cooperate with this mode of operation by minimizing current peaks and extending the duration of current flow therethrough. In a circuit designed in this manner and having a device with a relatively low switching voltage and a relatively high holding current, the circuit switches on when the voltage is relatively low, the device remains conductive for a relatively extended period because the capacitor and the external load are such as to accommodate large current flow. As soon as current flow falls below a relatively high minimum, the device is shut off and voltage builds up thereacross; this happens rapidly because the triggering or switching voltage is low, and conduction begins rapidly and continues as long as a relatively high current is available to flow. Consequently, while the voltage is reduced in relation to that of a circuit which includes a switch with a high breakover voltage, both th frequency and the effective duty cycle are greatly increased and significant power can be accommodated because the pulses of current last for a longer time, and because they are closely spaced apart from each other in time.

Referring now specifically to FIG. 30, the behavior of the principal elements of a circuit designed for a relatively high power application are shown where they may be compared with their relatively lower counterparts shown in FIG. 3a.

FIG. 30 shows that the voltage $V_{dev}$ on the device builds up during a relatively short period of time $T_{OFF}$ with a characteristic curve 1100 and then drops instantaneously as at 1102 when the relatively low switching voltage $V_S$ is reached. Thereupon, the voltage across the device (exclusive of the forward drop) remains at zero for a relatively long time $T_{ON}$. Thereafter, the voltage builds up again as shown at 1100 and the cycle repeats itself. The conductive period is shown as being relatively long in relation to the non-conductive "off period". The amplitude of the wave is relatively low in relation to that of its counterpart in FIG. 3a because, as pointed out, in the higher power application, it is desired that the time required to reach the switching voltage be relatively short.

Referring to the diagram of the voltage $V_{pri}$ in the primary, it will be noted that no voltage builds up in the interval 1106, inasmuch as the switch is in a non-conductive condition, but when the device switches on, the voltage rises instantaneously as at 1108, continuing to rise more slowly thereafter as a function of the applied line voltage, as at 1110, until the device turns off, dropping the voltage instantaneously, as at 1112, back to zero, where it remains, as at 1106, until the cycle is repeated.

Referring now to the current in the primary $I_{pri}$, the value thereof is shown to be zero when the device is non-conductive, as at 1114, and then to gradually increase and decrease, as at 1116, during the conductive period, until the current is again switched off, as at 1114, by the device.

The current build-up in the primary is characteristically the lower amplitude, greatly horizontally extended pulse shown at $I_{pri}$ in FIG. 30.

The behavior of the current, $I_{pri}$ in FIG. 30, in building up relatively slowly as contrasted to the rapid current build-up shown in FIG. 34, is accounted for by the reactance of the primary circuit, namely by the capacitance of the series capacitor, the inductance of the primary winding and the value of the impedance Z reflected into the primary from the external load. The delay in this current is similarly retarded for the same reasons; current flow in the primary ceases completely when the value of the instantaneous current flowing through the device falls below the holding current and the device switches "off".

The current behavior in the secondary $I_{SEC}$ is shown to be characterized by a rapid increase 1128, followed by a gradual decline 1130, subsequent to which a non-conductive period shown at 1132 takes place. The secondary current is much greater than that shown in FIG. 3a; also, it is shown to occur in the relatively short interval during which the switch device is in a non-conductive state.

The voltage build-up on the capacitor $V_{CAP}$ shown in FIG. 30 is also characteristic of the behavior expected where the series capacitance is relatively large. During the time the device is non-conductive, the voltage on the capacitor is at a predetermined level 1134, following which it builds up gradually as shown at 1136 until transiently levelling off, as at 1138, before receiving the next pulse of current shown at 1140. This stepwise charging of the capacitor is similar to the action shown in FIG. 3a, except that because the capacitor is larger, the voltage build-up thereon occurs more slowly, and much greater current flows into the capacitor.

By using a larger capacitor in a primary circuit such as that shown in FIG. 1, in conjunction with a switching device having a relatively lower switching voltage and a relatively higher holding current, certain advantages are realized. One of these advantages is that, because the switch on voltage of the device is low, significant time is not wasted in awaiting voltage build-up on the device. Consequently, the device may switch on and remain conductive for a major portion of the time. This is in contrast to the situation wherein substantial time elapses as the device must await the build-up of a higher threshold voltage.

Inasmuch as the switch device, which is intended to subdivide the line voltage into individual pulses must always shut off before it can again turn on and pass additional current, the advantages derived from requiring a higher holding current may be appreciated. When the current passing through the device is at a high level, significant amounts of energy are being transferred. As the current passing through the device tends to diminish, the device, if it requires a high holding current, can there upon shut off and await being switched to a conductive condition as the voltage thereacross again reaches the threshold. This will occur in a short time because the breakover voltage is low, and the device will again begin to conduct. If the device were characterized by a low holding current, it could be switched on rapidly and easily, but it might spend a significant portion of its duty cycle in conducting currents which would be undesirably low, and which, for practical purposes, would constitute a wasted effort on the part of the device. The more desirable mode of operation would be the switch conducting high currents for relatively long periods of time, then shutting off instantaneously and remaining off for the shortest possible periods of time. In this manner, the product of voltage and average current would be the greatest, and the power able to be handled by the device would likewise be at a maximum. The time during which the switch is in a non-conductive or in the "off" condition will reduce the average current and accordingly, as the duty cycle became higher, the ability of the device to handle power will correspondingly increase.

Referring now to certain other characteristics of the invention generally, it will be recognized that those skilled in the art can design and/or select individual circuit components, and will be able to design circuits to take best advantage of the principles of the invention for any given application. As a guideline for optimizing these features and characteristics, certain considerations should be kept in mind. Referring first to those applications wherein a transformer is used, the transformer should be relatively high primary inductance to provide a good ET constant and high energy storage. The transformer should have low DC winding resistance, preferably less than three ohms, by way of example only. Ideally, the transformer will have relatively few turns to achieve the required primary inductance and low copper loss. The transformer should have high dielectric strength, such as 1600 $V_{rms}$ or more, should have a low interwinding capacitance $C_i$ and a low leakage inductance $L_l$. Provided the transformer has substantially a unity turns ratio, then $C_i$ and $L_1$ would be relatively low. The core loss of the transformer $P_{diss}$ should be relatively low, and this is achieved by using a larger core and a reduced flux density. Using a core which is large enough for the applicable load and has a low enough flux density to avoid saturation will provide a transformer, which will be relatively efficient and thus possess a high "Q" factor.

Referring now to the capacitor, namely, the principal energy storage capacitor normally in series with the bilateral switch, a desirable design will incorporate a high capacitance in a relatively small physical space, will be characterized by low inductance $L_s$, low E.S.R. (equivalent series resistance)—and thus will have a low dissipation factor "D". Such a capacitor will withstand high voltage, and must typically therefore be able to withstand significantly greater voltages than the typically applied line 120 or 240 volt line voltage (RMS).

Referring now to the switch unit, commonly referred to herein as the "device", such device is preferably a solid state device which, in those applications wherein bilateral function is desired, has the same breakover voltage and the same holding current in both directions. In those applications wherein precise voltage control is desired, the device should consistently and repeatedly switch at as nearly an identical voltage as possible. In those applications wherein measurable amounts of power are required, the holding current should be relatively high and should be the same in both directions. In some applications, it is desired to have the switching voltage of the device adjustable or programmable between relatively higher and relatively lower voltages. The device should possess high sensitivity, that is, it should have low gate currents and voltages, $I_{gt}$ and $V_{gt}$, which should be the same or as nearly identical as possible in both directions of current flow. The parameters of the device should be the same or similar in diagonally opposed quadrants and it should have a high dv/dt capability. The device should have a low leakage in the off or non-conductive state and should have a good di/dt capability.

Inasmuch as it is now common in the electronics industry to design and make solid state devices for particular applications, it will be possible for those skilled in the art to design and manufacture, or to have designed and manufactured for them, special solid state switching devices, with or without auxiliary functions, for use in any number of circuits using the principles of the present invention. As such devices become more common, it may merely be necessary to select from available devices, or to design, build or have built still further devices. The present invention is advantageously operative with those bilateral switching devices referred to herein, but the principles of the invention are applicable to circuits containing other devices of various kinds, some of which may be relatively desirable, and others of which, although useful for the purposes in question, are not presently as practical or desirable for these purposes.

One example of an operation but not presently preferred device, which can be switched on by the presence of certain threshold voltage and which will continue to conduct during the presence of a predetermined current, is the neon lamp. However, such a device is much less than ideal inasmuch as it has a high switching voltage, the voltage drop across the device in the conductive condition is relatively high, the internal resistance is high, the times required for turning on and off are relatively slow because of gas ionization, the current capabilities are limited, the above characteristics are not particularly stable and the tolerances are very broad, and because the device possesses a wear out mechanism, namely, cathode erosion over a period of time. The device is nonetheless operable in certain applications because of its ability to switch at a determined or determinable voltage into a conductive mode and to cease conducting in the absence of certain required voltages and currents.

Certain semi-conductor devices which are useful in the practice of the present invention include the "Diac" type of device referred to above, i.e., a two-terminal, three-layer, non-regenerative device which possesses a negative resistance region. The "Diac" is characterized by a relatively stable and repeatable breakover voltage and a somewhat lower voltage "switch off" state, which is semi-stable. The device is available in both unilateral and bilateral configurations. In the unilateral form, the device possesses a normal diode PIV characteristic in a reverse direction. The breakover or switch on voltage ranges from about 16 to 120 volts, and the device operates essentially as an avalanche transistor without a base lead. Although superior to the neon lamp in many respects, it somewhat resembles the neon lamp in terms of switching characteristics.

Another device is the Shockley diode, a two-terminal, fourlayer regenerative device characterized by a stable and repeatable breakover voltage below which exists a stable off or non-conductive state. The on state of this device is about 1.0 to 1.5 volts, thereby essentially displaying the first quadrant characteristics of two series connected, forward based diodes. In a unilateral configuration, this diode has its normal PIV characteristics in a reverse direction and a switch on voltage from about 8 to about 600 volts. The device is essentially a two-leaded implementation of a transistor regenerative pair or a semi-conductor controlled rectifier SCR without a gate lead. Two such diodes in inverse parallel relation constitute a bilateral switch for certain applications of the present invention.

Another device suitable in some respects for the practice of the invention is the SCR, a three-terminal device which is well known to those skilled in the art. Such a device has a relatively high switch on or breakover voltage generally referred to as $V_{bo}$ and a gate lead is used to receive a control signal for switching the device to a conductive state.

The bilateral Shockley diode is a two-terminal five-layer device having the Shockley diode characteristics in both forward and backward directions. The device may be made in unitary or monolithic form and a switch on voltage of 3 to 10 volts, and being provided with a third lead which can be used for various purposes, including lowering the threshold or switch on voltage. Another device which may be useful with certain circuits made according to the present invention, is the "Triac", a three-terminal device similar to the two-terminal devices described above except that the switch on voltage $V_{drom}$ is very high and a gate lead is used to control the "on" or conductive state of the device. These and other devices not specifically referred to herein presently exist in the marketplace, although they do not necessarily represent the optimum or ideal solid state device which can easily be fabricated to have the parameters desired for use with the present invention. Inasmuch as it is well known to control other characteristics of a circuit in a more or less complex manner with the aid of additional control devices, it is anticipated that those practicing the invention would develop their own custom or non-standard integrated circuit (IC) devices having the characteristics desired for the particular application.

Reference will now be made to different forms of switching devices which are useful with the present invention, but which are not embodied in a single solid state device such as a "Diac" or Shockley diode. Referring now to another effective circuit for switching the current on and off in an apparatus according to the invention, FIG. 31 shows such a circuit to include a pair of transistors $Q_1$ and $Q_2$, and a control circuit portion schematically shown in box form as control circuit 1200. The transistors $Q_1$ and $Q_2$ are arranged in anti-parallel relation, with the emitter-collector circuit of $Q_1$ permitting current flow in the direction shown by the arrows therewith, and with the emitter-collector connections of transistor $Q_2$ being arranged to permit current flow in the opposite direction, that is, in the direction shown by the arrow associated with transistor $Q_2$.

Lines 1202, 1204 are connected as shown. It will be understood that the current to be switched is the principal current, i.e., that which will flow in the series circuit which includes the connections 1202, 1204. Hence, the switch comprising transistors $Q_1$ to $Q_2$ may be referred to as a power handling switch as distinguished from switches intended only to act as control means in turning the power handling switch on and off. The control circuit generally designated 1200 is shown to include leads 1206, 1208 therefrom, with lead 1206 being connected to the base of transistor $Q_1$, and lead 1208 being connected to the base of transistor $Q_2$. In use, as will appear, the transistor $Q_1$ is intermittently enabled by the control circuit when the voltage on the line current is a positive-going voltage, and transistor $Q_2$ becomes conductive when the line current provides a negative-going voltage. The mechanism for switching the transistors on and off is referred to elsewhere herein.

In the form of circuit shown in FIG. 31, the transistors are preferably of the type which are capable of rapidly switching from an "off" (or open), low leakage state to an "on" (or closed), low resistance, low forward drop ($V_{sat}$) state on command of a low base current, and which can switch rapidly back to the "off" state in the absence or removal of such base current. Transistors having the ability to switch a relatively high emitter-collecter current rapidly under control of a relatively low base current are referred to as having a high "$\beta$" (Beta). A typical transistor for this application would have a $V_{br}$ collector-to-emitter capability of not greater than about 10 volts, a value which is readily achievable in practice, using known transistors, an NPN type transistor is more suitable for this application than a PNP type, owing to ease of fabrication and operating parameters. As pointed out, the anti-parallel configuration of the transistors provides the bilateral current flow capability required to charge and discharge the series capacitor, such as the capacitor 30 shown in FIG. 1.

Referring now to FIG. 32, another form of power handling switching device is shown. In this application, uni-polar transistors of the VMOS, power FET type are used. In such case, bilateral current flow capability is achieved by connecting them in series with a common drain connection. Referring in detail to FIG. 32, a bilateral switching circuit for handling current flow to the series capacitor is generally designated 1250 and is shown to include a vertical metal oxide semi-conductor (VMOS) power field effect transistor (FET), $Q_1$, and a second field effect transistor $Q_2$ in series therewith.

A control circuit 1252 for the series switch arrangement just described has leads 1254, 1256 connected respectively to the bases of the transistors $Q_1$ and $Q_2$. A series capacitor 1258 and an inductor 1260 complete the basic elements of the circuit, which includes lines 1262, 1264 connected across an AC source 1266.

In a circuit of this sort, the control circuit portion 1252 will also switch the transistors $Q_1 Q_2$ off and on, as will be explained. When the transistors conduct, first in one direction and then in the other, the series capacitor 1258 is charged and discharged, thereby sending pulses through the primary winding or inductor 1260, which will be understood to be inductively coupled in relation to a secondary winding (not shown) forming a part of a secondary circuit for any of the purposes referred to above.

Referring now to FIG. 33, one operative form of circuit is shown which is used to control the transistorized power handling switching circuits just described. This control circuit, generally designated 1280, is shown to include a pair of NPN transistors $Q_1$ and $Q_2$, arranged in a common emitter configuration, and also to include a third output drive transistor $Q_3$ for purposes which will now appear. The control circuit 1280 also includes a terminal 1282 connected to a positive voltage source, normally arranged so as to detect the positive-going voltage building up in the line. A pair of lines 1283, 1284 are connected to this terminal 1282, with line 1284, which, includes a resistor 1286 being connected as at reference voltage junction 1302, to a Zener diode 1298. Line 1283 is connected to the emitter lead of the output transistor $Q_3$, while two lines 1288, 1292 extend respectively from line 1283 through resistors 1290, 1294 in the lines to the collectors of the transistors $Q_1$ and $Q_2$. A common emitter line 1295 includes a resistor 1296 which is grounded, as at 1297, as is the Zener diode 1298. A control line 1299 extends from the collector line 1288 of transistors $Q_1$ to the base lead of transistor $Q_3$.

A line 1300 extends from an exterior point at which the positive-going voltage of the input signal may also be sensed to the base of transistor $Q_1$, while a line 1301 extends from the reference junction 1302 to the base of the transistor $Q_2$.

In the operation of this control circuit, there is provided, effectively a decisional element capable of sensing and responding to some physical parameter, such as voltage. The type of circuit just shown is a voltage comparator and, in operation, acts as a voltage comparator. The positive-going signal at terminal 1282 provides a voltage reference at junction 1302 (by reason of the provision of the reference Zener diode 1298); when the voltage sensed in line 1300 rises relative to the reference voltage, the transistor $Q_1$ is triggered into conduction. When current flows in the line 1288, the base of the PNP transistor $Q_3$ receives a signal from line 1299, rapidly triggering $Q_3$ into full conduction. The strong signal appearing at terminal 1303 is then fed, for example, to one of the other of the base leads of one of the switching transistors $Q_1$ and $Q_2$ in the circuit of FIG. 31, enabling it to conduct.

In this arrangement, the state of the output drive transistor $Q_3$ is made to depend on the voltage level appearing in the sensing line 1300; when this value is higher than the reference, $Q_1$ is triggered into conduction and this enables transistor $Q_3$ to be turned on. While the current passing periodically through the emitter-collector circuit of transistor $Q_3$ is large in relation to that of transistors $Q_1$ and $Q_2$, its absolute value is still merely that of a control signal, and accordingly, it is operative only to provide current to the transistor bases in the power handling switches through lines 1206 or 1208 of the circuit of FIG. 31, for example.

By the same token, a control circuit of the type shown in FIG. 33 can be used to supply current through the control lines 1254 or 1256 of the circuit 1250, thereby enabling either of the transistors $Q_1$ or $Q_2$ in the power handling switch circuit 1250 of FIG. 32.

The illustrated circuit of FIG. 33 has been shown merely for the purposes of describing the function of turning on the power handling or switching transistors which are included in the current-carrying portion of the circuit of the invention. Another, similar device can be provided to turn off the transistorized switching arrangement of FIG. 31, such as by suppressing current in lines 1206 or 1208, for example. In other words, if transistor $Q_1$ (FIG. 31) is triggered into conduction by the presence of current in line 1206 when a certain reference voltage is detected in line 1300 (FIG. 33), a counterpart detector set to turn off current flow in line 1303 would have the effect of disabling transistor $Q_1$ of FIG. 31 and shutting off current flow in this portion of the main circuit.

By way of another example, a second differential amplifier might be provided having a power and output drive transistor in series with the transistor $Q_3$ of FIG. 33, with the circuits being arranged so tht both transistor $Q_3$ and a transistor in series therewith would be required to be in a conductive state for transistor $Q_1$ of FIG. 31 to be conductive, with the two series transistors being alternately enabled and disabled by different reference voltages.

It will be apparent to those skilled in the art that numerous other forms of apparatus may be provided for this purpose, the foregoing circuits being shown merely to illustrate that a transistorized or other solid state circuit may be provided to act as the current-carrying portion of the switch device in series with the capacitor in the circuit of the invention, with a control circuit being separately provided to turn the switch device on and off, normally with such device serving to turn the switch on and off in both directions of current flow.

Referring now to another form of control circuit which would be useful with the switch arrangements of FIG. 31 and 32, a voltage comparator may be designed and made to possess hysteresis, so that a single control device will turn on at a certain voltage and turn off at another voltage, for the purpose of setting the "switch on" and "switch off" voltage thresholds of the power handling control transistors such as that of $Q_3$ in FIG. 33. Implementations of this form of hysteresis-containing control circuits are known to those skilled in the art and are merely representative of the numerous forms of control circuits which can be made for this purpose.

Referring now to FIG. 34, another form of circuit is shown which is useful with the invention and which may be used for a purpose which will now be discussed. Referring first, however to FIG. 14, it will be noted that in the drawings and description thereof, a capacitor 310c was shown and described as serving to act as a noise maker, and that such capacitor was placed in parallel with the solid state bilateral switch device 316c, whereas in most or all of the other illustrated figures, the capacitor or inductor providing the load was shown to be in series with the switching device.

In discussing FIG. 14, the capacitor 310c was described as characterized as having very high impedance, and therefore resisting flow of significant current around the switch 316c. Accordingly, the switch controls flow of virtually all of the current into the series capacitor 308c. Referring now to FIG. 34, a circuit which is similar in some respects is designated 1400 and is shown to include an alternating current source 1402, a pair of leads 1404, 1406, a series capacitor 1408, a bilateral, solid state, voltage sensitive switch 1410 and a primary inductive winding 1414 in parallel with the switch unit 1410.

A core 1414 and a secondary circuit generally designated 1416 are also provided, it being understood that the design of the secondary circuit is not critical, and may be a circuit such as that shown in FIGS. 1 or 5, for example, or any other desired secondary circuit. In the arrangement of FIG. 34, the winding 1412 has a very high inductance, both by reason of its own characteristics and by reason of the reactance reflected from the secondary circuit 1416. Accordingly, only a relatively small current will flow therethrough when the switch 1410 is open.

In operation, the circuit functions in a manner similar to the circuit of FIG. 14. In other words, when the positive-going voltage from the source 1402 and appearing at the junction 1418 is sufficient to fire the switch 1410, the switch acts as a shunt with respect to the winding 1412, and rapidly passes a short duration pulse of current into the capacitor 1408. When the current in the pulse passes below the holding current of the device 1410, it switches off, thereby permitting a voltage again to begin building up thereacross, but also permitting small but measurable current to flow through the winding 1412. This current then passes through the winding 1412, inducing a substantially equal and opposite current in the secondary circuit 1416. When the voltage again appearing at junction 1418 has risen to the switch-on voltage of the device 1410, another pulse of current is rapidly passed into the capacitor 1408. Of course, if the inductance of winding 1412 were too small, the voltage required to trigger the switch 1410 would never build up, or would not build up rapidly enough to cause the switch 1410 to operate frequently during each portion of the AC cycle, as is desired.

Referring now to FIG. 35, the current passing through the switch is shown to increase and decrease rapidly after relatively long quiescent intervals. This illustrates that the switch is in a conductive condition during only a very short portion of the cylce, and that during the remainder of the time, with the switch being open or in a non-conductive condition, energy is directed through the primary winding 1412 and into the capacitor 1408. Accordingly, as shown in FIG. 36, while the current in the primary winding 1412 also rises rapidly and decays rapidly, it uses over a longer time period and is characterized by a much longer, almost continuous duty cycle, which is substantially the complement of the duty cycle of the switch shown in FIG. 35; in other words the current flow in primary is almost continuous, with only short periods of interruption, whereas current flow through the switch is normally non-existent, with short periods of rapid conductivity.

As a consequence, small but significant current is present in the primary winding, and this power may be passed through the core 1414 and into the secondary circuit 1416.

Referring now to FIG. 37, a form of modified circuit generally designated 1400A is shown to include an AC source 1402A, a pair of leads 1404A, 1406A, a bilateral solid state switching device 1410A, a high inductance, first primary winding 1412A, a series capacitor 1408A, a core 1414A, and a secondary circuit generally designated 1416A. A terminal 1418A is provided whereat line 1404A divides into two parallel portions, one comprising the switch 1410A and the other the primary winding 1412A. A second terminal 1420A is provided, between which and the capacitor 1408A is connected a low inductance, a second primary winding 1422A.

The secondary circuit 1416A is typically the same as, or similar to that which would be utilized in the circuits of FIGS. 1 or 6, for example. In the operation of the circuit of FIG. 37, advantage is taken of the characteristics of the different current and voltage waveforms developed in the two inductors 1412A, 1422A. The first portion of the primary circuit operates in the same manner as that of the primary circuit portion of FIG. 34, with the switch 1410A passing short, intermittent pulses of current and with the winding 1412A providing pulses of greater width or duration. Current passing through either the switch 1410A or the first primary winding 1412A is then passed through the low inductance or second primary winding 1422A. This winding, however, receives both the current passed through the other primary winding 1412A and the current passing through the switch device 1410A. Since both primary windings are associated with a common core 1414A, the secondary circuit "sees" the power passed through the switch device as well as the power passed through the primary winding in parallel therewith. This provides excellent transformer utilization, and is a useful form of circuit according to the invention where pulses of different magnitudes and durations are not objectionable in the secondary circuit, as might be the case where the circuit is used as a battery charger, for example.

Referring now to the characteristics of a circuit made according to FIGS. 34 and 37, such circuits use larger greater duty cycles than would a lower power, low-pulse-duration circuit such as that of FIG. 1, and accordingly would require larger transformers. However, the circuits are still advantageous with respect to prior art 60-cycle transformer operations, which, because of the "ET" constant referred to herein, require large amounts of copper and large cores.

A transformer used with a circuit of FIGS. 34 or 37 would be larger than that used with the apparatus of FIG. 1, for example, assuming the power passed therethrough to be the same, but the transformer would still be significantly reduced in relation to a 60-cycle transformer of the same power. Certain advantages of the circuit are that full utilization is made of the transformer, and that much smaller filter capacitors are required in the secondary circuit in view of the higher frequency (relative to 60-cycle current) and in view of the fact that the intervals between the pulses are very small in relation to their counterparts in a 60-cycle circuit. While much higher inductance of the windings 1412, 1412A dictates that these elements would be physically larger than would normally be required in circuits wherein the inductors are in series with the switching devices, nevertheless, the circuits of FIGS. 34 and 37 illustrate the principle that the advantages of the circuits of the invention may be achieved by placing a load, either a high impedance load, either capacitive or inductive, in parallel or partially in parallel with the switching device as well as in series therewith.

Referring now to other variations which may be made in the circuits described as comprising preferred forms of the invention, it is also possible, in addition to the application illustrated in FIG. 19, wherein a magnetostrictive device is illustrated, to operate or use a solenoid as a striker for the purpose of making noise. In such case, a circuit similar to that of FIG. 19 would be provided, except that, instead of the magnetostrictive rod or bar element 614 being provided, and instead of securing such element at one end thereof as is the ordinary practice, the magnetostrictive element would be replaced with a low-mass armature positioned for free but limited movement, and consequently, the combination of the low-mass armature and the winding would operate as a solenoid. In this application, the solenoid armature would strike a bell or other noise-making apparatus periodically. The bell or like device being struck would then ring with its own characteristic tone.

Referring now to other noise-making apparatus which might be substituted, a reed element may be provided for this purpose. Thus, in an application such as that shown in FIG. 12 or FIG. 19, the magnetic field generated by the coil could be operated or utilized to cause vibration of a resonant or tuned reed which would create an audible sound for annunciation or other purposes. Likewise, a non-resonant or resonant reed can be provided and disposed in the magnetic field, with the reed having a portion thereof adapted to stroke a bell or other noise-making instrumentality which would resonate at the same or a different frequency as the oscillation or vibration frequency of the reed itself.

Referring to another form of noise-making apparatus which would be useful according to the invention, the noise-making device such as that illustrated in FIGS. 13–15, and 17, 23a and 23b are shown as being capacitors which also serve as noise-makers. As described in the above portions of the specification, one operative form of such capacitor is the piezoelectric ceramic capacitor which may or may not be affixed to a brass or other metal disc.

However, it is also possible to achieve a desirable noise-making effect by placing an electret element, which is itself a capacitor in a suitable circuit such as one of the circuits shown in FIGS. 13, 14, 15, or 17, for example. The electret element is normally a permanently charged or polarized capacitor using a TFE (Teflon) membrane which is adapted to vibrate and create sensible sound when placed in a suitably changing electrical field such as that created by the circuits of the invention.

Referring now to the forms of invention shown in FIGS. 25 and 26, apparatus were illustrated wherein light-emitting diodes or other similar devices were used for the purpose of creating a visible signal at low voltage and high frequency without utilizing inverters or other expensive and complex devices for this purpose.

One variation of the form of apparatus shown is the inclusion of one or more laser-type, light-emitting diodes in such an apparatus. A properly prepared laser-type, light-emitting diode, as is well known to those skilled in the art, will "lase" when it receives current above its characteristic threshold at which light emission becomes coherent, and will thereupon continue to emit visible light, usually visible light at an appropriate characteristic frequency. The highly collimated beam thereby produced is useful in burglar alarms and in a number of other applications wherein it is desired to propogate the beam towards a detector which is spaced considerably therefrom and which can detect the propogated beam or the absence thereof. The laser-type, light-emitting diodes are preferred for this purpose because they are highly efficient in terms of energy used to obtain the beam of light desired for the foregoing purposes. Accordingly, a laser-type LED may be suitably driven by pulses generated by the forms of circuits made according to the invention, and an apparatus of this type provides significant advantages in terms of compactness, utility, and cost.

Referring now to another application of the invention, so-called liquid crystal display elements ("LCD" or nematic crystals) are being more and more commonly used for optical display purposes. These LCD elements are actually capacitors, and accordingly, are not intended to be driven by direct current or any other energy form in which there is significant net power in one direction of current flow. Likewis,e, known LCDs do not work well with 60-cycle or other low frequency current but may be advantageously driven by high frequency current.

Where such high frequency is not available by reason of being incorporated into an otherwise available device, such as an LCD watch or the like already possessing high frequency multivibrators, oscillators or the like, the ability of the present invention to provide low cost, compact, high frequency alternating current may be taken advantage of. For this purpose, the liquid crystal display may be substituted in a number of the various applications described above, as will be apparent to those skilled in the art. In this connection, it will be noted that LCD devices inherently are low voltage operated; the low voltage, high frequency currents generated by the circuits of the invention are therefore ideal for operating such LCDs. Because of their characteristically low capacitance, LCDs may be used in the shunt form of circuit (e.g. FIG. 14) or the transformer isolated form of circuit (FIG. 11).

Referring now to a still further embodiment of the invention, not illustrated in detail in the drawings hereof, but similar to that shown in FIGS. 25 and 26, it is well known that means for creating visible light include so-called electroluminescent displays made from phosphors which emit visible light under the presence of suitably applied electric energy. As is well known, electroluminescent displays do not operate acceptably when energized by direct current, and perform at very low efficiency when the phosphors thereof are excited directly by 60-cycle AC current. Consequently, the use of electroluminescent displays has been significantly limited.

However, the devices of this type display increased illumination efficiency which would make them valuable for a number of applications when energized by relatively high frequency, high voltage energy.

In this connection, as frequency and voltage increase, the efficiency of the display increases, but raising the applied frequency has a more dominant effect than raising the voltage. Accordingly, bearing in mind the capacitive nature of such electroluminescent displays, they may be energized by suitable circuits of the present invention, such as the form of circuits shown in FIG. 13, or other of those illustrated circuits wherein their capacitive nature is best utilized.

Moreover, such electroluminescent devices may be advantageously used as the capacitor in the secondary circuit in applications such as the circuit of FIG. 11, wherein the transformer therein illustrated may be used to provide electrical isolation from the basic current source as well as stepping up the voltage, and wherein the primary portion of the circuit is used to increase the frequency of the energy supplied to the electroluminescent device. Accordingly, the advantages of such electroluminescent devices may be fully taken advantage of by utilizing the increased frequency and voltage provided by circuits such as that shown in FIGS. 11 and 13.

Referring now to another manner of implementing circuits made according to the present invention, it is possible to make a "transformer" other than an electromagnetic transformer, using piezoelectric elements having capacitive characteristics, as will now be described. In such a "transformer" a first piezoelectric element, that is, a ceramic or like material which will undergo dimensional change under the application of a changing electrical field, is placed in the high frequency portion of a circuit containing the switch and capacitor of the invention. This circuit, when operated, causes a rapid mechanical displacement of the ceramic, piezoelectric ceramic material. To this material is mechanically attached a second piezoelectric material which is arranged, somewhat in the manner of the capacitive device illustrated in FIG. 23b, such that it will be dimensionally in response to the applied electric field. When the second ceramic material is moved physically and undergoes physically dimensional change, it produces an output voltage and current which is characteristic to both the frequency and the amplitude of the energy applied to it. This electrical energy thus created in the driven piezoelectric crystal may be used or passed through a pair of diodes present in a secondary circuit, such as the circuit illustrated in FIG. 6 for example. Consequently, the device as a whole acts as a transformer, with the "primary" portion consisting of a piezoelectric device wherein electrical energy is supplied and mechanical motion is taken out and the "secondary" acting as a circuit in which mechanical energy is the input and electrical energy constitutes the output. The provision of diodes or the like prevents a net discharge or loss then through the transformer. Such an apparatus accordingly achieves the advantages of a mechanically coupled by electrically isolated apparatus which has advantages and characteristics useful in a manner of specialized applications.

One implementation of such an apparatus is shown in FIG. 40, wherein an electrical apparatus generally designated 1475 is shown to include an alternating current source 1476, a bilateral switch 1478, a pair of leads 1479, 1480 extending to opposite poles of a first piezoelectric ceramic element 1481. This element 1481 is secured along a margin 1482 to an insulating film or the like 1483, one surface 1484 of which is secured along a margin 1485 to a prism 1486 of a second piezoelectric ceramic material which is in turn laminated to another, third prism 1487 thereof. An electrical line 1488 connects the prism 1486 to an external resistance circuit shown schematically at 1489, with another electrical line 1490 completing the circuit.

In this form of construction, when the source 1476 is energized, the switch 1478 operates in the manner previously described to create alternate pulses of electrical energy in the first ceramic element 1481, which acts as a capacitor, transiently storing the pulses of energy flowing into and out of the capacitor during charging and discharging thereof, and also deflects beamwise in response to th energy applied thereto. This deflection is transmitted to "bimorph" or second pair of prisms of ceramic material, and motion applied thereto with a contracting and expanding mechanical motion creates an output signal having pulses of the frequency of that applied to the first ceramic element 1481. This apparatus is useful for creating a transforming effect without the need of electromagnetic components, and can also provide electrical isolation or insulation such as that provided by the non-conductive plate 1483 or the like which is made from a material of adequate dielectric strength.

Referring now to still another embodiment of the invention, FIG. 38 shows a circuit generally designated 1500 and shown to include a primary circuit portion generally designated 1502 and a secondary circuit generally designated 1504. In this form of circuit, an alternating current source 1506 is shown to be provided, and conductors 1508 and 1510 extend therefrom, with a bilateral switch device 1512, a "drive" or primary winding 1514, and a series capacitor 1516, all being shown in series circuit relation.

A wire 1518 is shown to form the core of an element which will be described, and which is operatively somewhat the counterpart of an electromagnetic transformer generally designated 1520, with the "secondary" thereof comprising a "sense" winding 1522. Diodes, a filter capacitor, and a load resistor (not numbered) form the secondary portion of this circuit which may be of the form shown in FIG. 38, such as or any other suitable form of circuit, such as those shown in FIGS. 1, 5 or 6, for example.

In the particular form shown, the circuit differs from one having a conventional transformer core in that the element providing the operative association between the primary and secondary circuit includes a so-called Wiegand wire core 1518, made from a specially work hardened magnetic wire of a homogeneous alloy, having a hard exterior "shell" that requires a much higher applied magnetic field to change its direction of magnetization than does the softer, inner core of the wire.

By way of example, the wire is only 0.010 inches in diameter, and 3 centimeters long. The counterpart to the primary "drive" winding is typically a coil of only a few turns of wire 1526, with such wire turns being wound around both the Wiegand wire core 1518 and the secondary winding 1522. The turns 1526 need only be sufficient to create a magnetic field from about 20 up to about 150 Oersteds.

In operation, according to the principles of the Wiegand effect, the build-up and decay of the magnetic field caused by the pulsing currents passed through the windings 1526 will induce sharp pulses in the secondary winding 1522, and these pulses, of a highly uniform voltage, may be rapidly generated, and subsequently rectified and filtered in the secondary filter. The use of the Wiegand wire energy transfer phenomenon makes possible the provision of extremely compact cores or energy transfer devices corresponding to a transformer, bearing in mind that a typical wire "core" would be only of the dimensions referred to above, and that the secondary would be in the form of a coil wound around a very small diameter. The drive winding surrounds the secondary winding, and both sets of wires are electrically insulated, magnet wire of a known type. Accordingly, the use of the Wiegand effect may be advantageously used in the circuits of the present invention, which provide simple means for generating the magnetic field current pulses required to operate the apparatus.

Referring now to FIG. 39, switching characteristics are shown which are typical of another form of bilateral solid state switching device useful with the invention. In this illustration, the vertical axis 1600 is the current, horizontal axis 1602 is the voltage, and the solid line 1604 shows the switching characteristics. Line 1604 includes a portion 1606 running generally parallel but slightly inclined from the positive voltage line, indicating the presence of very slight build-up of leakage quantities of current with rising voltage until the predetermined switching or breakover voltage $V_s$ is reached.

Here, a transition point 1608 in the curve indicates that the current increases rapidly to the switching current $I_s$. The portion 1610 of the curve shows a negative resistance region which is typical of this type of device, and wherein current increases as the applied voltage decreases, until the voltage has dropped to a "switch back" voltage 1612. The dotted line 1614 shows a possible switching trajectory followed by the device, which becomes non-conductive until the breakover or switching voltage is again reached, whereupon the cycle is repeated. The curve 1604A is the same except it appears in the third quadrant of the voltage-current diagram.

In a typical "Diac" device used with the invention, the voltage is from about 18 volts up to about 100 volts, and the switch back voltage is generally about 25 to 35 percent of the switching voltage. The actual effective switching voltage is the difference between the switch back voltage and the switch on voltage. By way of example, in a Diac with a 20 volt breakover voltage, 20 volts would be required for initial firing, but thereafter, the device would operate between 14 volts (20 volts minus 30 percent) and 20 volts, thereby operating for almost all of the cycle at a switching voltage of 6 volts. During transition of the input signal from a positive-going to negative-going voltage, a higher switching voltage would be required, but after the device has become conductive, it will repeatedly switch on and off over a 6 volt drop or potential range until the polarity changes again. Accordingly, having an average effective switching voltage of about 6 volts, the device would provide an output frequency of approximately 6,000 Hz. While switching devices of the Diac type just described, and those of the Shockley diode or SBS type referred to earlier, are not ideal for all applications, they are examples of existing devices which make possible realization of numerous varieties of apparatus which incorporate the principles of the present invention.

In the foregoing description, a large variety of apparatus has been described, and the advantages of the described circuit have been pointed out. In this connection, it will be realized that there are prior art circuits which are intended to provide certain of the advantages of the invention; however, a number of existing devices of this sort have proved unduly complex, and some or all of such circuits have been unable to operate from input sources wherein one or more characteristics of the signal vary, even within relatively small limits. For example, constant voltage transformers such as the "SOLA" and "Wanlass" transformers provide a highly regulated, constant voltage. However, these transformers are extremely sensitive to variations in frequency, and their utility is therefore significantly limited where a constant frequency input signal is not available or where special provisions for a carefully regulated frequency source must be made.

On the other hand, circuits and apparatus made in accordance with the present invention are able to provide carefully controlled voltages without depending on an input signal of either carefully regulated frequency or voltage.

According to the present invention, certain useful apparatus may be made wherein the frequency of the input signal is subdivided and used directly for a desired purpose, such as exciting an alarm or other noisemaker element. In other cases, advantage may be taken of the high frequency signals which are readily generated by the simplified circuits of the invention to reduce transformer size and cost to a very great degree.

In other embodiments, the circuits of the invention provide output energy in different forms, such as electromagnetic pulses, mechanical pulses and the like. In other embodiments, advantage may be taken of circuit elements which are inherently present in the invention to perform secondary tasks, such as in the circuits wherein the series capacitor not only provides transient energy storage but also blocks the direct current supplied to a telephone subscriber line from the central office.

In still other embodiments, high frequency, carefully voltage regulated current, or pulsating or fixed voltage direct current, is produced, by switching devices which utilize a current handling portion and a control portion which are separate from each other. In other circuits, power handling and control are accomplished by single devices, preferably solid state devices. Circuits according to the present invention may be adapted to a broad variety of uses by incorporating custom made switching devices, which may or may not be incorporated in integrated circuits.

Still other forms of apparatus may be made using existing switching devices such as the SBS's and "diacs" described. A number of the circuits of the invention provide safety advantages which reside in isolating relatively high voltage line current from the point whereat the noise, light, or other signal is displayed or whereat other work is done. The circuits of the invention make possible the low cost production of displays or illumination from devices such as LCD's or electroluminescent displays which cannot be powered by ordinary line current as a practical matter. The circuits of the invention are useful in all of the foregoing, and in a number of other applications, wherein advantage may be taken of their inherent operating characteristics.

It will thus be seen that the present invention provides electrical energy conversion systems, apparatus and circuits having a number of advantages and characteristics, including those pointed out above and others which are inherent in the invention. A number of preferred embodiments of the invention having been set forth by way of example, it is anticipated that further variations and modifications will occur to those skilled in the art and it is contemplated that such changes may be made without departing from the spirit of the invention or the scope of the appended claims.

I claim:

1. A power supply unit adapted for connection to a source of alternating current providing an alternating current input signal and adapted to provide an output signal having an increased frequency and a maximum output voltage which is substantially independent of the voltage and frequency of said input signal, said power supply comprising a primary circuit portion, a secondary circuit portion, and a transformer operatively coupling said primary circuit portion to said secondary circuit portion, said transformer including a primary winding and a secondary winding, said primary circuit portion comprising said transformer primary winding, a capacitor, and bilateral switch means in series with said capacitor, said switch means comprising first and second switch elements arranged parallel to each other and having a common input terminal and first and second, non-common output terminals, a flip-flop device having an output terminal connected to each switch element so as to supply an enabling and disabling signal to each of said switch elements, said switch elements each being adapted to pass current in both directions therethrough and each adapted to switch to a conductive state in the conjunctive presence of a first signal responsive to a change in at least one characteristic of said input signal and an enabling signal from said flip-flop, each element being also adapted to switch to a non-conductive state in response to another change in a characteristic of said input signal, said transformer primary winding having one terminal thereof connected to said output terminal of said first switch element and the other terminal thereof connected to the output terminal of said second switch element, said primary winding being tapped and having means connecting said primary winding tap to said capacitor, said first switch element being thereby associated with a first portion of said primary winding and said second switch element being associated with a second portion of said primary winding, said secondary circuit portion including, in addition to said secondary winding, means for connecting the terminals of said winding to an electrical load so as to apply the signal created in said secondary circuit to said electrical load, said primary circuit being arranged so that, in use, said first and second switch elements, under the control of said flip-flop operate so as to alternately energize said first and second primary winding portions when said input signal is positive-going and also to alternately energize said first and second primary winding portions when the said input signal is negative going.

2. A power supply unit as defined in claim 1 wherein said primary winding is center tapped.

3. A power supply unit as defined in claim 1 wherein said transformer secondary winding is a center tapped winding, and wherein said secondary circuit further includes means for rectifying the signal in said secondary winding before said signal is applied to said electrical load.

4. A power supply unit as defined in claim 3, said secondary circuit also including means for filtering the signal in said secondary circuit after said signal is rectified.

5. A power supply apparatus adapted to produce a higher frequency reduced voltage output signal from an alternating current input signal of lower frequency and higher voltage, said power supply including means for connection to said alternating current source, a switch means adapted to subdivide said input signal into a plurality of current pulses of increased frequency and reduced voltage, a capacitor in series with said switch means, and means forming a part of said circuit and being operatively coupled to a secondary circuit which includes an electrical load adapted to be energized by said output signal, said switching means being adapted to switch between conductive and non-conductive states in response to changing characteristics of said input signal, said switching means comprising bilateral current handling switch means and a control assembly for operating said switch means, said control assembly including means for detecting a change of characteristics in said input signal in both positive - and negative-going directions, control signal means for triggering the current handling elements of said current handling switches into conductive and non-conductive conditions, and means for impressing said control signal on said current handling switch means.

6. A power supply apparatus as defined in claim 5 wherein said current handling portion of said circuit comprises a pair of bipolar NPN transistors arranged in anti-parallel relation, with the base of each transistor connected to said means for impressing said control signal thereon.

7. A power supply apparatus as defined in claim 5 wherein said current handling portion of said circuit comprises a pair of field effect transistors in series with each other, said transistors having a common drain connection.

8. A power supply apparatus as defined in claim 5 wherein said control assembly includes a detector portion and a power output portion, said detector portion comprising means for sensing a voltage change in said input signal and said power output portion including means for alternately switching a power output transistor from a conductive to a non-conductive state, with the output of said power output transistor being connected to as to comprise said means for impressing said control signal on said current handling switch means.

9. A power supply unit adapted for connection to a source of alternating current providing an input signal of a predetermined voltage and a given frequency and adapted to provide a highly controlled direct current output having a very slight output voltage variation and a predetermined maximum output voltage which is independent of the voltage and frequency of said input signal, said power supply comprising a primary circuit portion and a secondary circuit portion, said primary circuit portion comprising a bilateral solid state switching device and a capacitor in series with said switch device, said primary circuit further including first and second inductors in series with each other and with said first conductors being arranged parallel to said switch device and said second inductor being arranged in series with said switch device and said secondary circuit portion comprising a third inductor in coupled relation to said first and second inductors, and for rectifying the signal in said third inductor, said switch device having a selected breakover voltage and a predetermined forward drop voltage, said breakover voltage being very small in relation to the voltage variation of said input signal, said switch device being adapted, in operation, to subdivide said input signal into a plurality of pulses having a voltage determined by said breakover voltage less said forward drop voltage rather than by variations in said input voltage, and whereby in use, said third inductor is energized by alternating current passing through said first inductor and by current passing through said second inductor.

10. An electrical circuit for subdividing an input signal having a time-varying voltage into an output signal of increased frequency, said circuit including means for connection to a source of said input signal, a pair of switch units in said circuit, each of said units having a predetermined switch-on voltage, and energy storage means in series with said switch units, said switch units being responsive to changes in at least one characteristic of said input signal so as to alternate between a first state wherein said switch units blocks substantial current flow to said storage means, and a second state wherein said switch units permits substantial current flow to said storage means, at least one of said switch units being operative, as said switch units alternate between said first and second states, to subdivide said input signal into a plurality of individual pulses, at least a portion of each of said pulses acting upon and being effective to vary the level of energy stored in said storage means during incremental change of the energy level of said storage means, switch-on voltage of one of said pair of switch units being different from the switch-on voltage of the other of said switch units, said switch units being thereby operative to subdivide said input signal into a first frequency as said storage means is charged and to subdivide said signal into a second frequency as said storage means is discharged.

11. A circuit as defined in claim 10 which further includes a capactitive element disposed in parallel with said pair of switch units, said capacitive means providing a high impedance relative to the impedance of said switching units when said switching units are in said second state.

12. A circuit as defined in claim 10, which further includes a first inductor disposed in said circuit parallel to said pair of switch units, and a second inductor in said circuit diposed in series with said energy storage means, said first inductor having a very high impedance in relation to the impedance of said switch units when said switch units are in said second state, said circuit further including a secondary circuit portion including means for connection to an electrical load, said secondary circuit also including a third inductor operatively coupled to said first and second inductors.

13. An electrical circuit for subdividing an input signal having a time-varying voltage into an output signal of increased frequency, said circuit including means for connection to a source of said input signal, a pair of switch units in said circuit, each of said units having a predetermined switch-on voltage, and energy storage means in series with said switch units, said switch units being responsive to changes in at least one characteristic of said input signal so as to alternate between a first state wherein said switch units blocks substantial current flow to said storage means, and a second state wherein said switch units permits substantial current flow to said storage means, at least one of said switch units being operative, as said switch units alternate between said first and second states, to subdivide said input signal into a plurality of individual pulses, at least a portion of each of said pulses acting upon and being effective to vary the level of energy stored in said storage means during incremental change of the energy level of said storage means, one of said switch units being adapted, when said switch-on voltage is reached, to remain conductive until the polarity of the voltage thereacross changes, said circuit thereby subdividing said input signal into a plurality of pulses as the energy level of said storage means changes in one direction, but not to subdivide said input signal as said energy level of said storage means changes in another direction.

14. A circuit as defined in claim 13, which further includes a capacitive element disposed in parallel with said pair of switch units, said capacitive means providing a high impedance relative to the impedance of said switching units when said switching units are in said second state.

15. A circuit as defined in claim 13 which further includes a first inductor disposed in said circuit parallel to said pair of switch units, and a second inductor in said circuit disposed in series with said energy storage means, said first inductor having a very high impedance in relation to the impedance of said switch units when said switch units are in said second state, said circuit further including a secondary circuit portion including means for connection to an electrical load, said secondary circuit also including a third inductor operatively coupled to said first and second inductors.

16. An electrical circuit for subdividing an input signal having a time-varying voltage into an output signal of increased frequency, said circuit comprising a primary circuit portion including means for connection to a source of said input signal, solid state, bilateral switching means in said circuit, said switching means having a selected breakover voltage and a predetermined forward voltage drop, capacitive energy storage means in series with said switch means, and a first inductor element, said switching means being responsive to changes in at least one characteristic of said input signal so as to alternate between a first state wherein said switching means blocks substantial current flow to said storage means, and a second state wherein said switching means permits substantial current flow to said capacitive storage means, said circuit being operative, as said switching means alternates between said first and second states, to subdivide said input signal into a plurality of individual pulses, at least a portion of each of said pulses acting upon and being effective to vary the level of energy stored in said capacitive storage means during incremental change of the energy level of said capacitive storage means, said circuit also including a secondary circuit portion including a second inductor, and means for coupling said first and second inductors, said means including a Weigand wire operatively associated with said first and second inductors.

17. An electrical circuit for subdividing an input signal having a time-varying voltage into an output signal of increased frequency, said circuit comprising a primary circuit, including means for connection to a source of said input signal, switching means in said circuit, capacitive energy storage means in series with said switch means, and a secondary circuit and means forming an operative connection between said primary and secondary circuits, said switching means being responsive to changes in at least one characteristic of said input signal so as to alternate between a first state wherein said switching means blocks substantial current flow to said storage means, and a second state wherein said switching means permits substantial current flow to said storage means, said circuit being operative, as said switching means alternates between said first and second states, to subdivide said input signal into a plurality of individual pulses, at least a portion of each of said pulses acting upon and being effective to vary the level of energy stored in said storage means during incremental change of the energy level of said storage means, said primary circuit including a first pizeoelectric element arranged to create mechanical motion in response to a first electrical signal applied thereto, said secondary circuit including a second piezoelectric element adapted to create a second signal when mechanical energy is applied thereto, and in which said means forming said operative connection between said circuit comprises a mechanical connection between said first and second piezoelectric elements, said circuit thereby including a portion adapted to provide electrical energy to said first piezoelectric element and said second piezoelectric element being adapted to supply electrical energy to said secondary circuit with said first and second piezoelectric elements being mechanically but not electrically connected to each other.

* * * * *